United States Patent [19]

Hirtle

[11] 4,031,517

[45] June 21, 1977

[54] EMULATION OF TARGET SYSTEM INTERRUPTS THROUGH THE USE OF COUNTERS

[75] Inventor: Allen C. Hirtle, Needham, Mass.

[73] Assignee: Honeywell Information Systems, Inc., Waltham, Mass.

[22] Filed: Apr. 24, 1974

[21] Appl. No.: 463,700

[52] U.S. Cl. .............................................. 364/200
[51] Int. Cl.² .......................................... G06F 9/18
[58] Field of Search .................... 340/172.5; 444/1; 445/1

[56] References Cited

UNITED STATES PATENTS

| | | | |
|---|---|---|---|
| 3,546,678 | 12/1970 | Callaway et al. | 340/172.5 |
| 3,560,937 | 2/1971 | Fischer | 340/172.5 |
| 3,596,256 | 7/1971 | Alpert et al. | 340/172.5 |
| 3,599,162 | 8/1971 | Byrns et al. | 340/172.5 |
| 3,665,415 | 5/1972 | Beard et al. | 340/172.5 |
| 3,713,109 | 1/1973 | Hornung | 340/172.5 |
| 3,729,716 | 4/1973 | Arulpragasam et al. | 340/172.5 |

*Primary Examiner*—Mark E. Nusbaum

*Attorney, Agent, or Firm*—Faith F. Driscoll; Nicholas Prasinos; Ronald T. Reiling

[57] ABSTRACT

A host system includes a plurality of memory cells, each reserved for a different one of a plurality of peripheral control devices of a target system. During the running of a target system program, the host system being emulated includes means for switching one of the memory cells reserved for a particular peripheral control upon detection of an interrupt condition resulting from the execution of a target system input/output instruction. Each time an interrupt condition causes the switching of one of these cells, the host system increments by one the contents of a counter representative of a bus present in the target system. Each time one of the cells of a bus is reset or cleared, the host system decrements by one the corresponding counter contents. A count of zero stored in the counter simulates the condition of a binary ZERO of providing a logical OR operation upon all of the interrupt signals of the peripheral devices connected to share the same target system bus while a non zero count stored in the counter simulates a binary ONE of performing a logical OR operation upon the interrupt signal lines on the bus.

26 Claims, 24 Drawing Figures

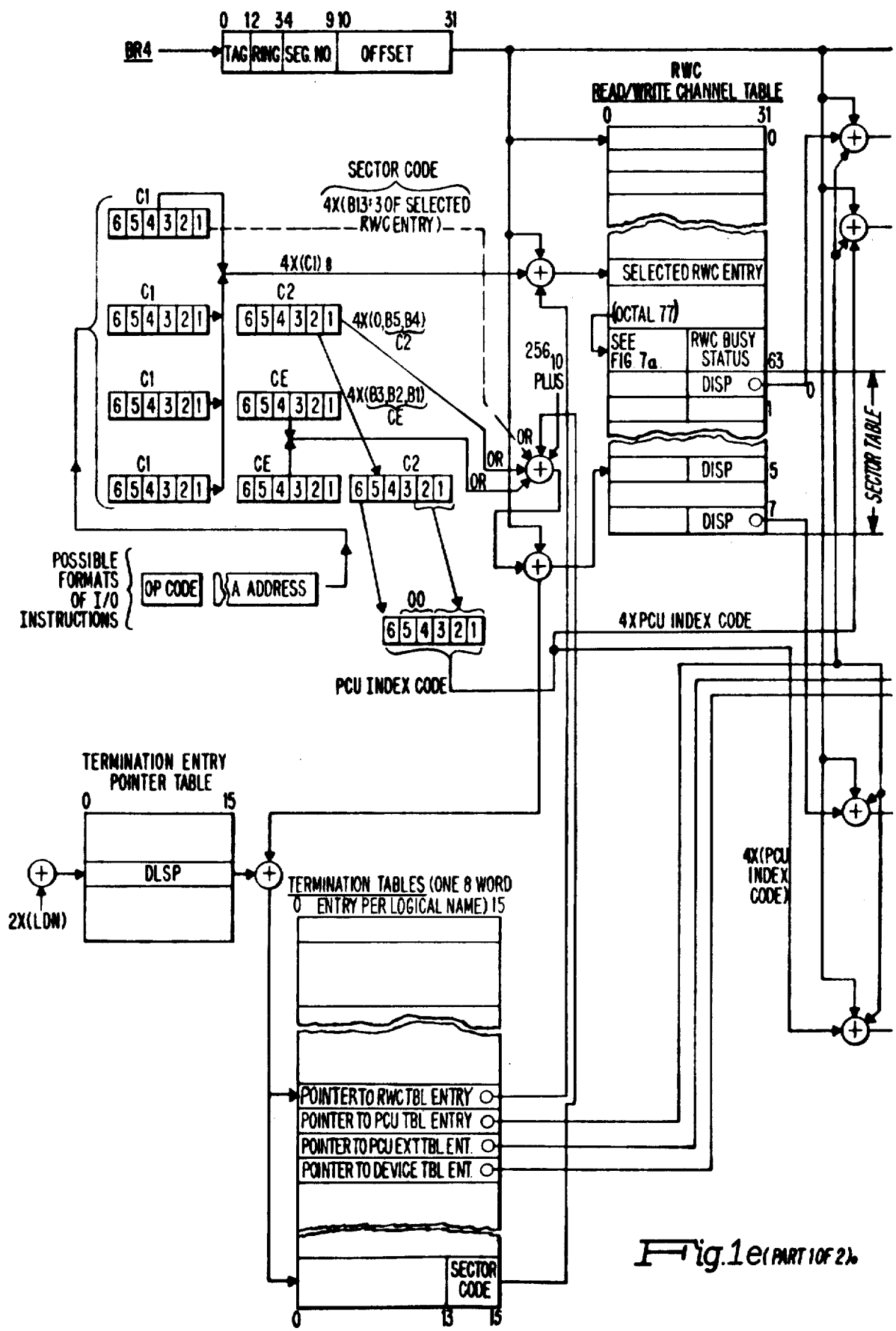
Fig. 1e (PART 1 OF 2)

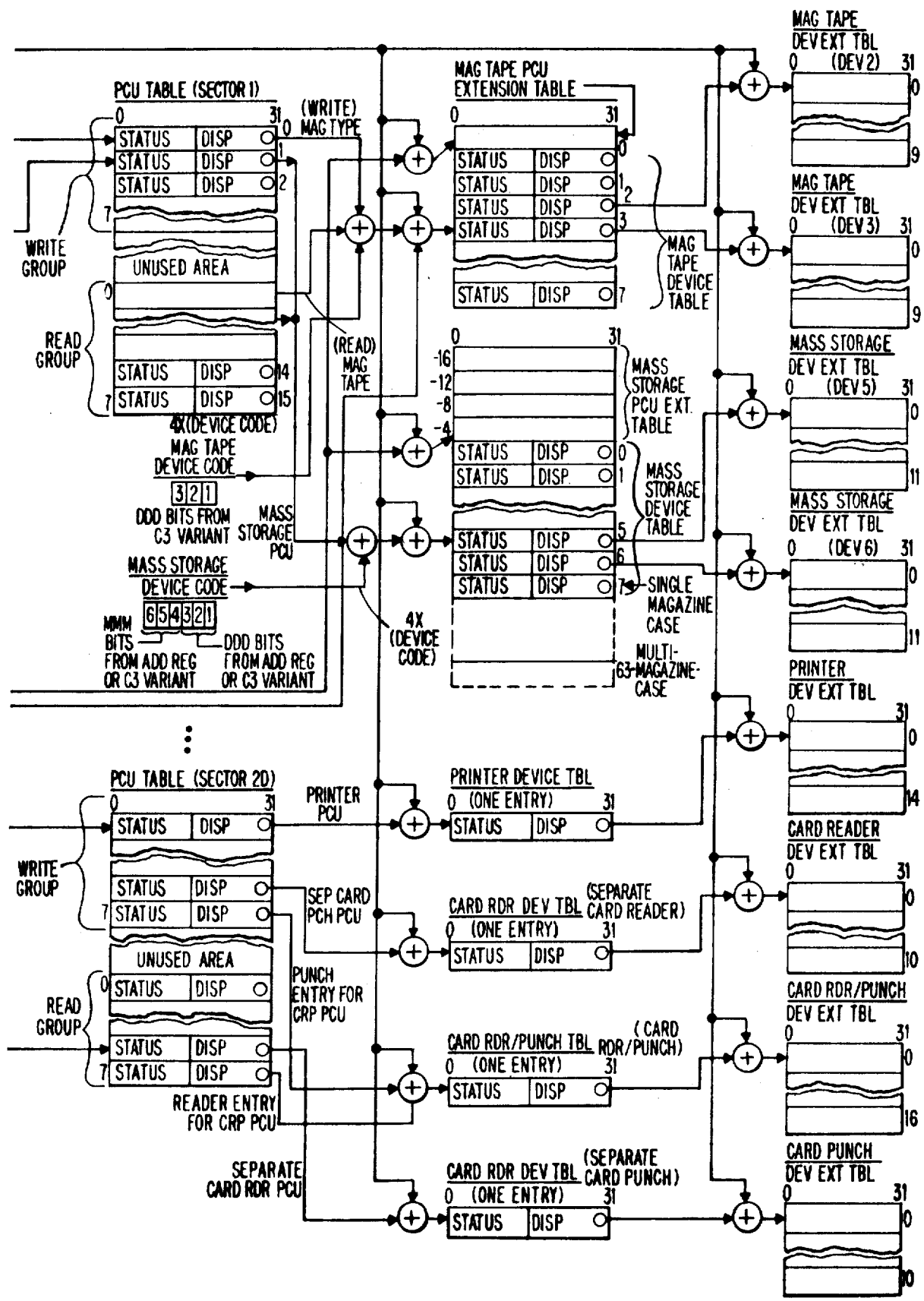
Fig. 1e (PART 2 OF 2).

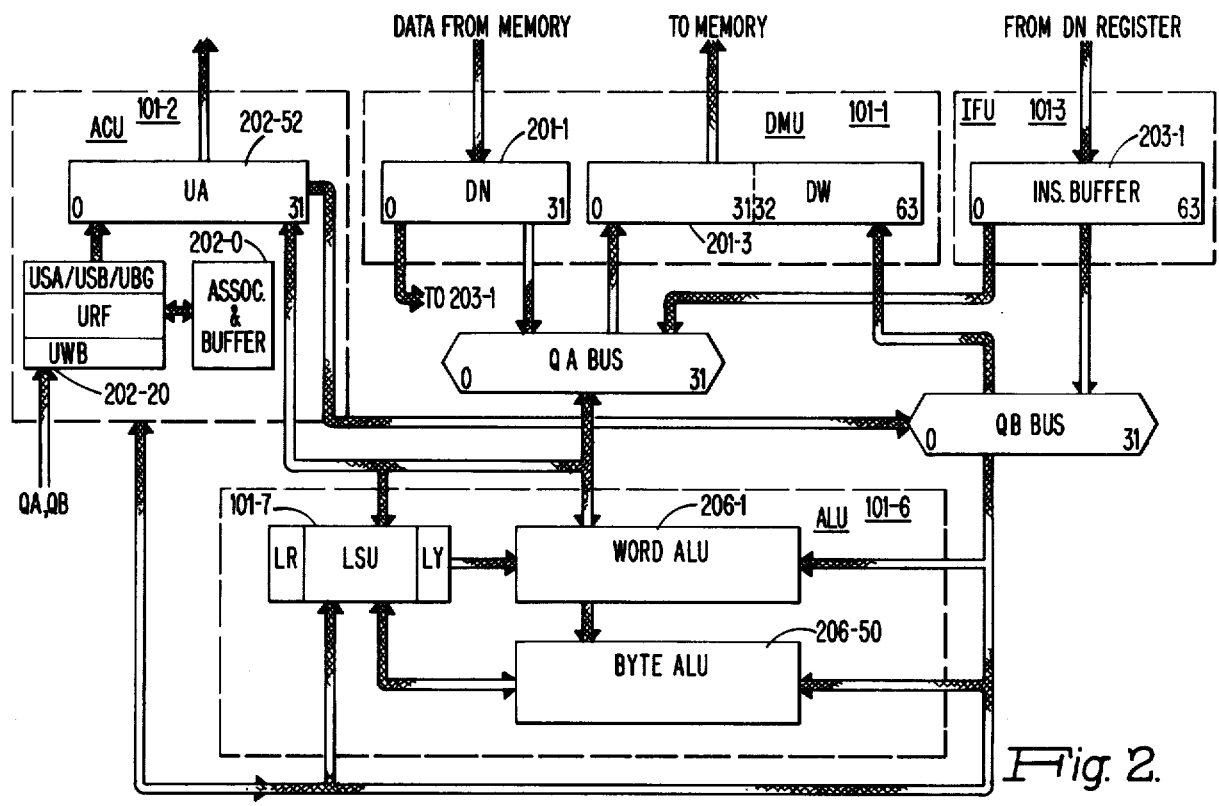
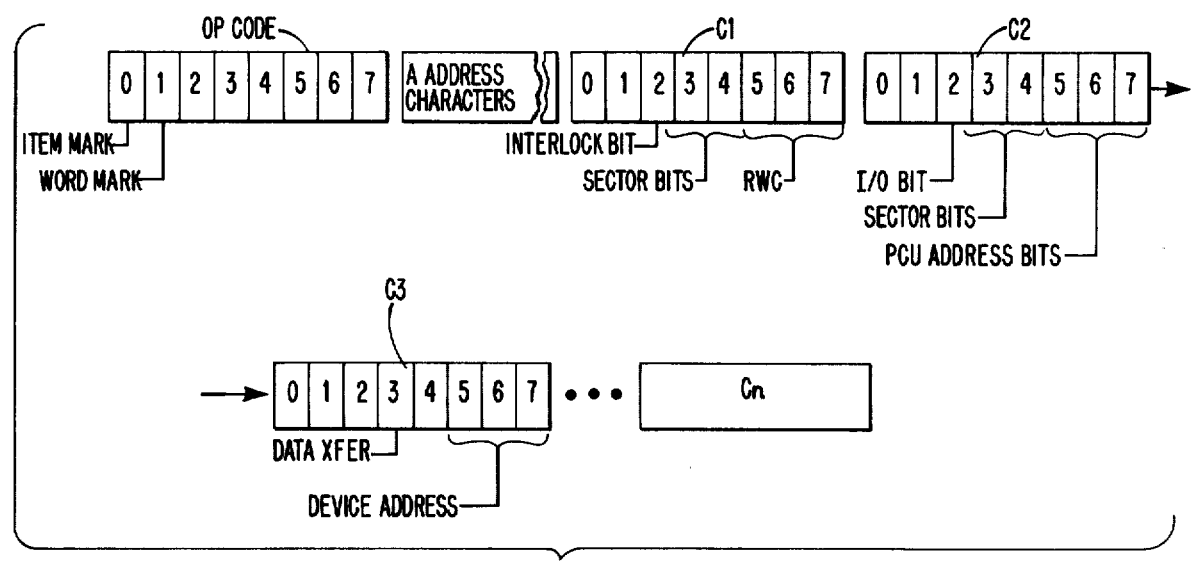

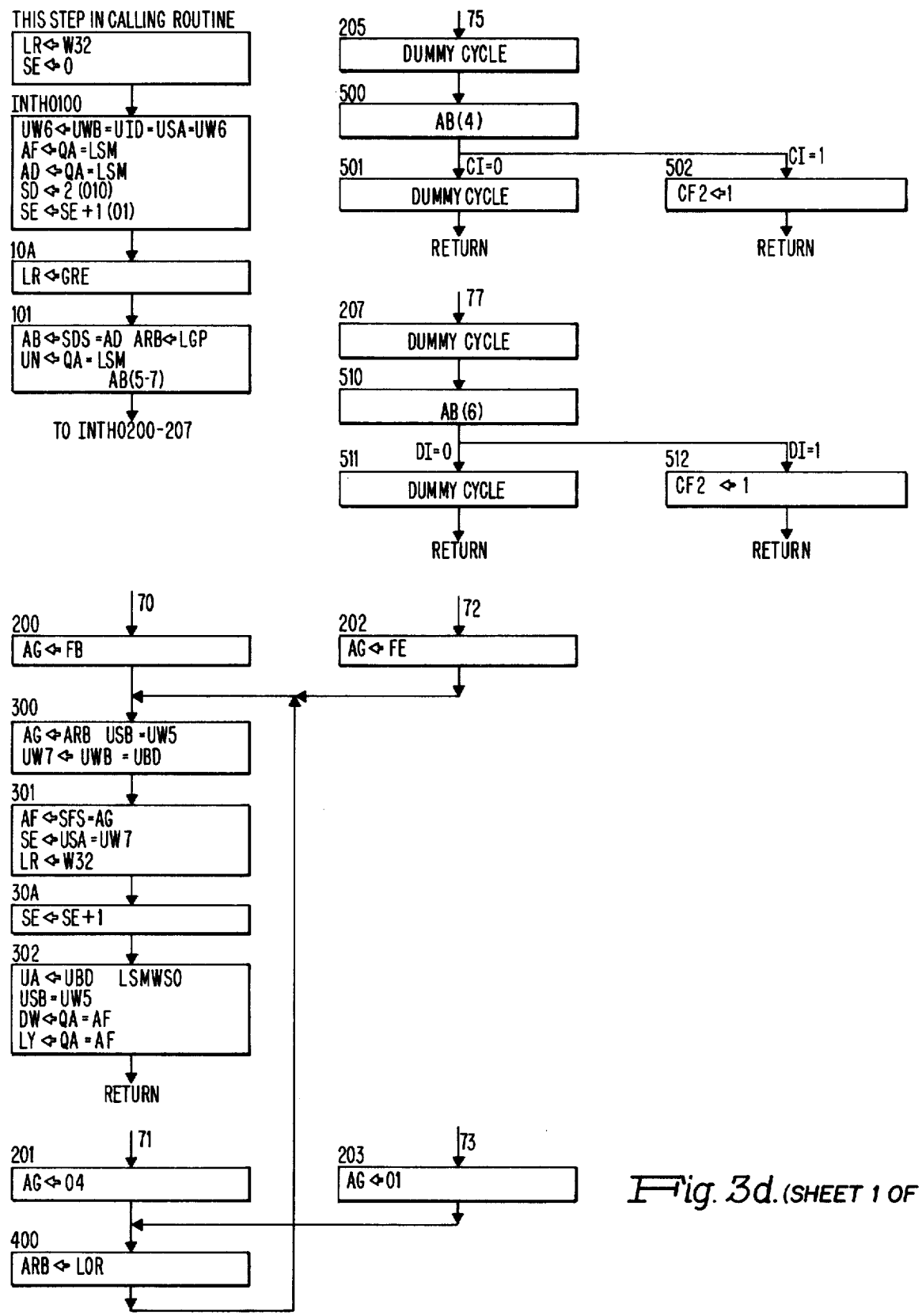
Fig. 3d. (SHEET 1 OF 2).

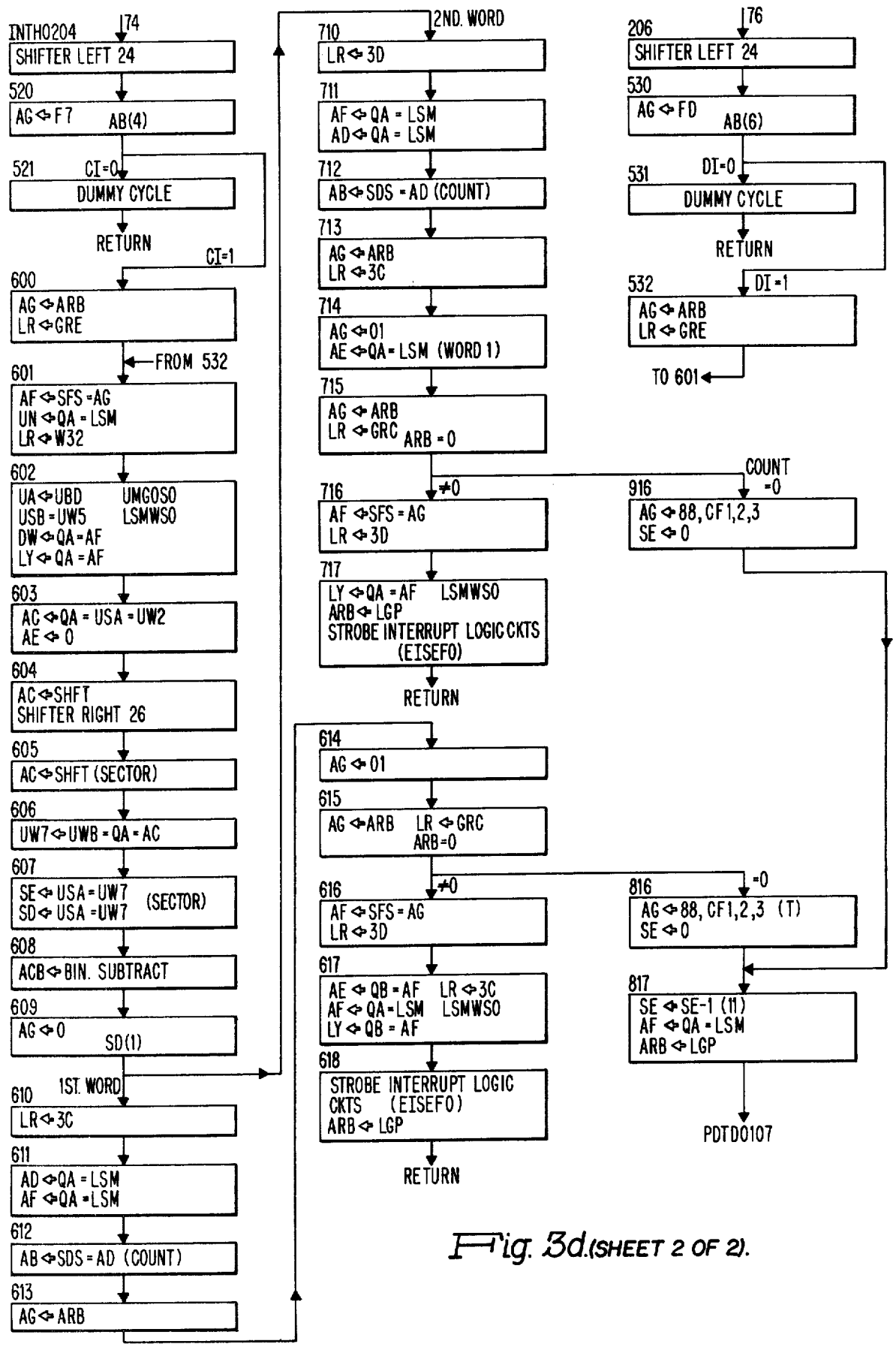
Fig. 3d.(SHEET 2 OF 2).

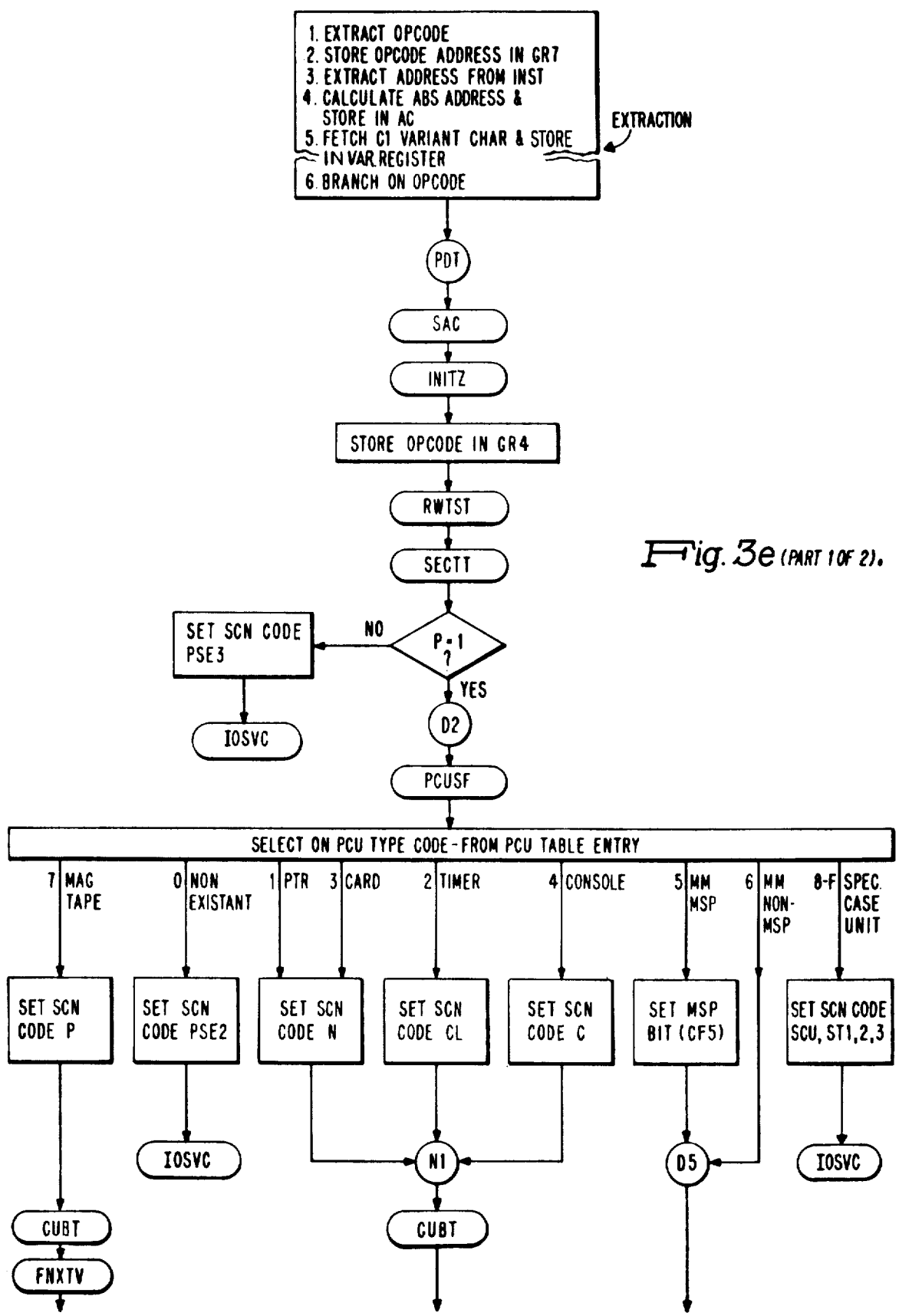
Fig. 3e (PART 1 OF 2).

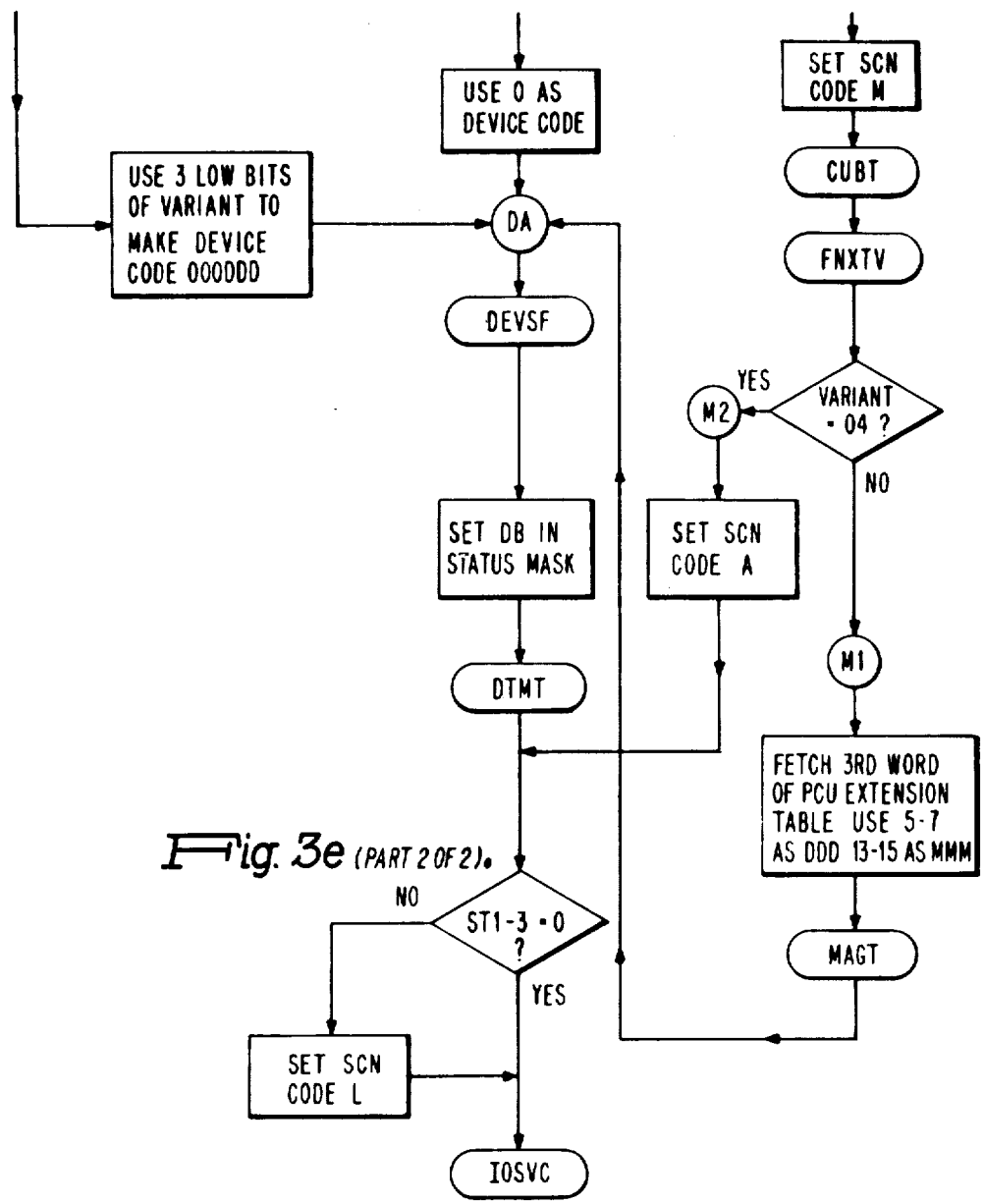
Fig. 3e (PART 2 OF 2).

EMULATION OF TARGET SYSTEM INTERRUPTS THROUGH THE USE OF COUNTERS

REFERENCED APPLICATIONS

The following copending applications are incorporated by reference into the following description.

1. "Table Driven Emulation System" invented by Allen C. Hirtle bearing Ser. No. 430,322 filed Jan. 2, 1974 which issued as U.S. Pat. No. 3,955,180, and assigned to the assignee named herein.

2. "Data Processing System having Emulation Capability for Providing Wait State Simulation Function" invented by Brent W. Coulter et al bearing Ser. No. 425,661 filed Dec. 17, 1973 which issued at U.S. Pat. No. 3,891,974.

BACKGROUND OF THE INVENTION

1. Field of Use

The present invention relates to processing interrupt signals in a data processing system.

2. Prior Art

It is well known to provide storage locations reserved for program status words and exchanging these program status words when an interrupt signal is received from peripheral device. For the most part, most systems include a microprogram processor in order to provide a high degree of flexibility and economy. Normally in this type of system, the processor responds to an interrupt signal and utilizes system software to acknowledge the interrupt, identify the device and take the appropriate action. Of course, this operation has been found to be relatively time consuming and requiring an assigned amount of memory for storing status and routines particularly when the system is required to service a large number of devices.

Additionally, systems of this type have provided for processing interrupts caused by either external peripheral devices or processor simulated external devices through the use of a microroutine contained within the processor's read only memory. While this reduces processing time, the arrangement has not been found suitable where there is a large number of peripheral devices since the microroutine would still require repeated execution to ascertain the interrupt status of each one of the plurality of devices particularly when they are connected to share a common bus and common interrupt facilities.

Accordingly, it is a primary object of the present invention to provide an improved system for processing interrupt signals from a plurality of peripheral control elements.

It is a more specific object of the present invention to provide a system included within a host processor for processing interrupt signals from any one of a number of buses of a target system which a plurality of peripheral control elements share a common interrupt signal line.

SUMMARY OF THE INVENTION

The above objects are accomplished in a preferred embodiment of the present invention which includes a host system having a main store which is capable of storing at least one target system program and having at least a storage location reserved for storing a count representative of the number of peripheral devices connected to one of a number of sector buses which can be present on the target system being emulated.

The main store further includes storage locations reserved for indicating the interrupt status of all of the possible peripheral devices which can be designated to execute operations by target program input/output instructions.

The host system further includes a control store containing microprograms for processing input/output instructions contained within the target system programs. The microprograms include a microprogram routine when referenced during the processing of input/output instructions is operative to set and reset any one of a number of interrupt cells in accordance with the input/output instructions under execution and to modify an interrupt count corresponding to the bus designated by such instructions so as to reflect the current status as to the number of interrupts outstanding on the target system sector bus. Also, at appropriate time intervals, the host system through microprogram routines is operative to examine the interrupt contents of a designated storage location to determine when an interrupt is outstanding on the corresponding target system sector bus. The system software also operates to decrement the interrupt count by one when a data transfer input/output target instruction is executed by host system which results in the resetting of a peripheral device interrupt cell. Additionally, the software normally increments the interrupt count by one each time the host system completes execution of an input/output operation previously initiated by the target system program.

By utilizing the arrangement of the preferred embodiment, the host system can quickly and expeditiously process interrupts of the emulated target system having peripheral control elements connected in common to share a common interrupt signal line. Specifically, the host processor before executing instructions of a target system program can readily ascertain the interrupt status of the target system by the current status of the interrupt count. Based upon the count, the host processor determines whether the emulated target system has an interrupt outstanding requiring the host system to enter a routine for servicing interrupts for the target system program under execution. Specifically, an interrupt count of ZERO simulates the binary ZERO result of logically ORing the interrupt indicator signals from all of the target system peripheral control devices connected in common interrupt facility. A non zero count simulates the binary ONE result of logically ORing the interrupt indicator signals from all of the peripheral devices. This eliminates the need for repeated execution of routines for examining the states of device interrupt status indications to ascertain whether the emulated target system has an interrupt outstanding.

The above and other objects of the present invention are achieved in the illustrative embodiment described hereinafter. The novel features which are believed to be characteristic of the invention, both as to its organization and method of operation, together with further objects and advantages thereof, will be better understood from the following description considered in connection with the accompanying drawings. It is to be expressly understood, however, that each of the drawings are for the purpose of illustration and description only and are not intended as a definition of the limits of the present invention.

BRIEF DESCRIPTION OF THE DRAWINGS

FIG. 1e shows the layout of the I/O tables of a main store segment in accordance with the present invention.

FIG. 2 illustrates in block diagram form the central processor subsystem of FIG. 1.

FIG. 3d illustrates in greater detail the interrupt handler routine of FIG. 3b.

FIG. 3e is a flow chart which illustrates the processing of a data transfer I/O instruction.

FIG. 6 illustrates in greater detail the coding of I/O instructions processed in accordance with the present invention.

Figure 1:
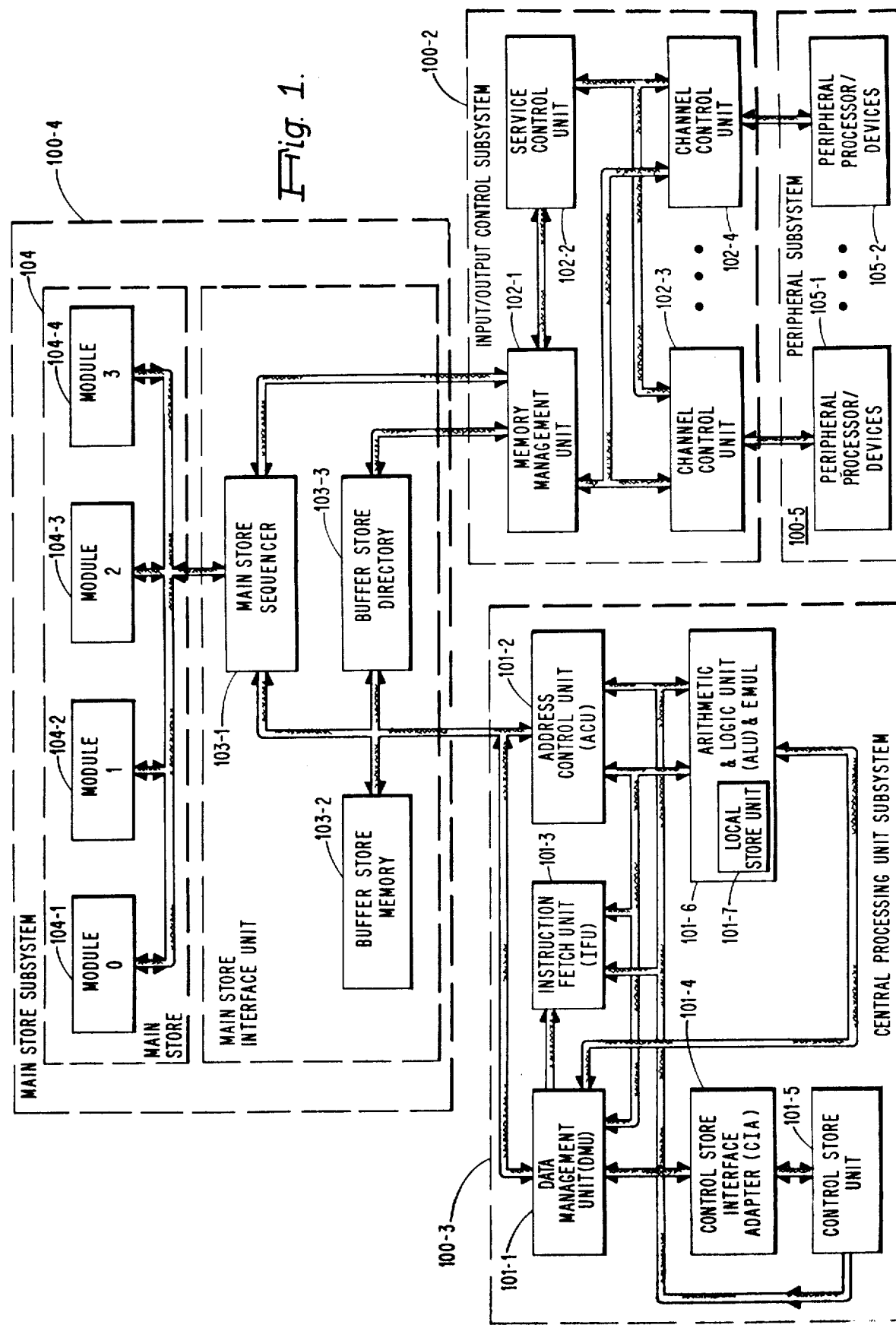
FIG. 1 is a block diagram of the system which incorporates the principles of the present invention.
Figure 1A:
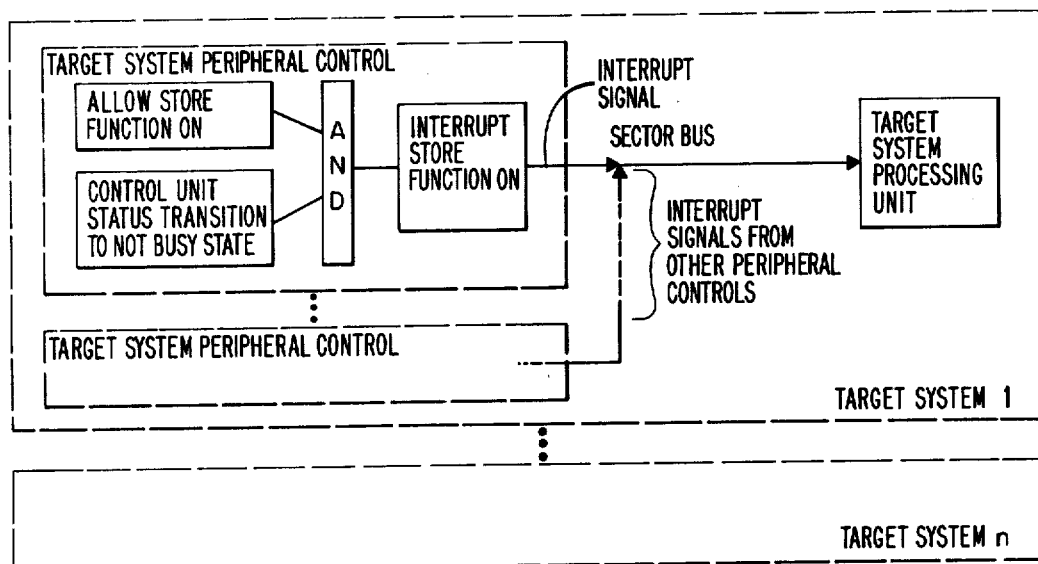
FIG. 1a illustrates diagrammatically the peripheral system of the target system emulated by the system of FIG. 1.

TARGET SYSTEM INTERRUPT PROCESSING — FIG. 1a

Before describing the system of FIG. 1, reference is first made to FIG. 1a which discloses in diagrammatic form the interrupt processing function of the target system. As seen from the Figure, the target system being emulated by the host system of the present invention includes a number of peripheral controls or peripheral control units (PCUs) which connect to a common sector bus which in turn couples to the central processing unit (CPU).

Each target system contains from one up to a maximum of six sectors. In the single sector system shown, each PCU has an interrupt circuit which includes two storage devices; an Allow Storage device and an Interrupt Function Storage device. When the Interrupt Store function is set or is turned "ON", the PCU applies a continuous interrupt signal to the CPU. The presence of this signal is normally tested in the target system through the use of a control I/O instruction. This instruction corresponds to a peripheral control and branch (PCB) instruction and is coded to be addressed to the peripheral control. Before the peripheral control is enabled to transmit the interrupt signal, the allow function storage unit should have been switched on by a PCB instruction. Thus, the interrupt circuits for a PCU are activated or deactivated by turning the allow function on or off respectively.

Each target system peripheral control at the completion of an input/output operation is operative to cause the PCU to be switched from a busy to a non-busy state which in turn is operative to set the interrupt function when the allow function has been previously set. In this way, the peripheral control signals the target system CPU for service.

As seen from the Figure, all PCU's share a common interrupt line and this arrangement effectively performs a logical OR operation upon the interrupt signals generated by the PCU connected to the sector bus. The operation of the target system programs by the CPU is structured to operate based on this logically ORED interrupt signal. Generally, when the target system CPU is operating in a normal mode, it will be sensitive to the peripheral interrupt signal to enter an interrupt mode of operation upon the completion of execution of a current instruction. Once having entered this mode, the CPU becomes insensitive to further interrupt signals until the target system program via an instruction signals the CPU to resume its normal mode. For further details regarding this mode of operation, reference may be made to a publication titled "Series 200 Programmer's Reference Manual (Models 200/4200)", Copyright 1971 by Honeywell Information Systems Inc. — Order No. BA85, Rev. O.

GENERAL DESCRIPTION OF THE SYSTEM

Referring to FIG. 1, it is seen that the system of the present invention includes a plurality of subsystems 100-1 through 100-4. The subsystems, as shown, correspond to a central processing unit subsystem 100-1, an input/output controller subsystem 100-2, a peripheral subsystem 100-3, a main memory subsystem 100-4 and a memory interface unit subsystem 100-5. The central processing unit subsystem 100-1 includes a data management unit (DMU) 101-1, an instruction fetch unit (IFU) 101-3, an arithmetic and logic unit (ALU) 101-6, a control store interface adapter (CIA) 101-4, and a control store unit (CSU) 101-5, all of which are arranged as shown in FIG. 1. The CPU subsystem performs the computational operations for the system and these operations proceed under the control of microinstructions stored in control store 105. In a preferred embodiment, these instructions are loaded into the control store 101-5 by a control store loader, convention in design, external to the central processing unit subsystem 100.

The CIA, 101-4 includes the logic circuits necessary for directing the sequencing of control store 101-5 required for processing operations. For example, the CIA 101-4 provides the required address modification, address generation, testing, branching facilities based on signals representative of both internal and external conditions.

The various operations, computational in nature, are performed by ALC 101-6 which includes both word and byte data processing facilities. Additionally, the ALU has associated therewith the local store unit (LSU) 101-7 which includes a small scratch pad memory and associated logic circuits, conventional in design, which are operative to store control information as well as operands and partial results produced during various computational and data manipulation operations.

The address control unit (ACU) 101-2 which couples to ALU 101-6 includes apparatus for generating addresses for referencing information stored within the memory subsystem. Additionally, the ACU 101-2 couples to the IFU 101-3 which includes circuits for fetching instructions in advance so as to maintain instructions available before completion of an instruction being currently executed.

The DMU, 101-1, provides an interface between the CPU subsystem and/or a buffer store memory 300-1, as shown. The DMU includes circuits which specify which portion of the memory of the main memory subsystem contains information to be retrieved during subsequent memory cycles and is operative to transfer the information into the CPU subsystem at the appropriate time.

The main memory interface unit subsystem 100-3 includes a buffer store memory 103-2, a buffer store directory 103-3, and a main store sequencer 103-1. The buffer store memory 103-2 provides temporary storage for information to be used next by the CPU subsystem as well as temporary storage for information that is to be utilized frequently during processing operations. The buffer store directory, 103-3, includes circuits for generating an address when the information called for by an operation is stored in the buffer store memory 103-2. The main store sequencer 103-1 provides an interface between the difference modules of the main memory subsystem 100-4 and the various subsystems shown (i.e. the IOC 100-2 and CPU 100-1).

The main memory subsystem 100-4 which couples to the main store sequencer of the memory interface unit subsystem which in a preferred embodiment includes four memory modules 104-1 through 104-4. These modules are operated under the control of the main storage sequencer in a number of different modes including an interleave mode of operation. These modules provide storage for information required by the processing components of the system during the execution of current tasks. For further details relating to the main storage sequencer, reference may be made to the co-pending patent application titled "Memory Storage Sequencer" invented by John L. Curley et al bearing Ser. No. 295,331 filed in the United States on Oct. 5, 1972 and assigned to the assignee named herein.

As shown in FIG. 1, the IOC 100-2 couples to the peripheral subsystem 100-5. The subsystem includes a plurality of "peripheral processors" or "peripheral controllers" which control the operations of a number of peripheral devices connected therewith (e.g. such as magnetic tape drives, mass storage units such as disks and unit record equipment such as printers, card readers, card punchers). The IOC controls information transfers between the peripheral subsystems and the main storage subsystem. For example, it can accommodate up to 16 peripheral subsystems, each of which as mentioned above manages a complement of magnetic tape, disk, card reader or punch devices, printers, etc. The IOC has an interface with the main storage system to transfer information between main storage and peripheral subsystems and to fetch groups of related instructions called "channel programs" from main storage and execute same without interrupting the operation of the central processing unit subsystem.

Additionally, the IOC has an interface with the central processing unit subsystem to deliver peripheral subsystems status information to the CPU for evaluation and/or action and to respond to CPU requests to begin execution of channel programs and to inform the CPU when channel program execution has been completed. Basically, in the preferred embodiment of the present invention, input/output operations are carried out under the control of a channel program which includes a complete set of instructions and addressing information for carrying out a particular input/output operations. The IOC includes both hardware/firmware required for executing a channel program. Execution of a program by the IOC is carried out through a plurality of channels. A channel is an access path from the CPU to the peripheral device for the purpose of executing and I/O operation. The channel includes the IOC facilities, a physical channel between the IOC and peripheral subsystem and a logical channel which includes the facilities in the peripheral subsystem required to execute a given I/O operation. In the preferred embodiment, a peripheral processor may handle up to 255 logical channels.

As seen from FIG. 1, the IOC subsystem includes a memory management unit 102-1, a service code unit 102-2 and a plurality of channel control units. Since the IOC can accommodate up to 16 peripheral subsystems, it includes a corresponding number of channel control units. As mentioned above, I/O operations are specified by channel programs. The channel programs are initiated by the peripheral processor over "logical channels" associated with the peripheral devices. The IOC maintains all information concerning the state of each logical channel and of the channel programs associated therewith. The channel programs are executed simultaneously with central processing operations thereby providing multiprocessing and multiprogramming facilities.

For the purpose of the present invention, the arrangement for executing input/output operations can be considered conventional in design. For additional information as to how channels are used to carry out input/output operations, reference may be made to the text titled "Computer Organization and the System/370" by Harry Katzan, Jr. published 1971 by Van Nostrand Rinehold Company.

Before describing the various components of FIG. 1, the organization of main store 104 will first be discussed with reference to FIG. 1b.

Figure 1B:
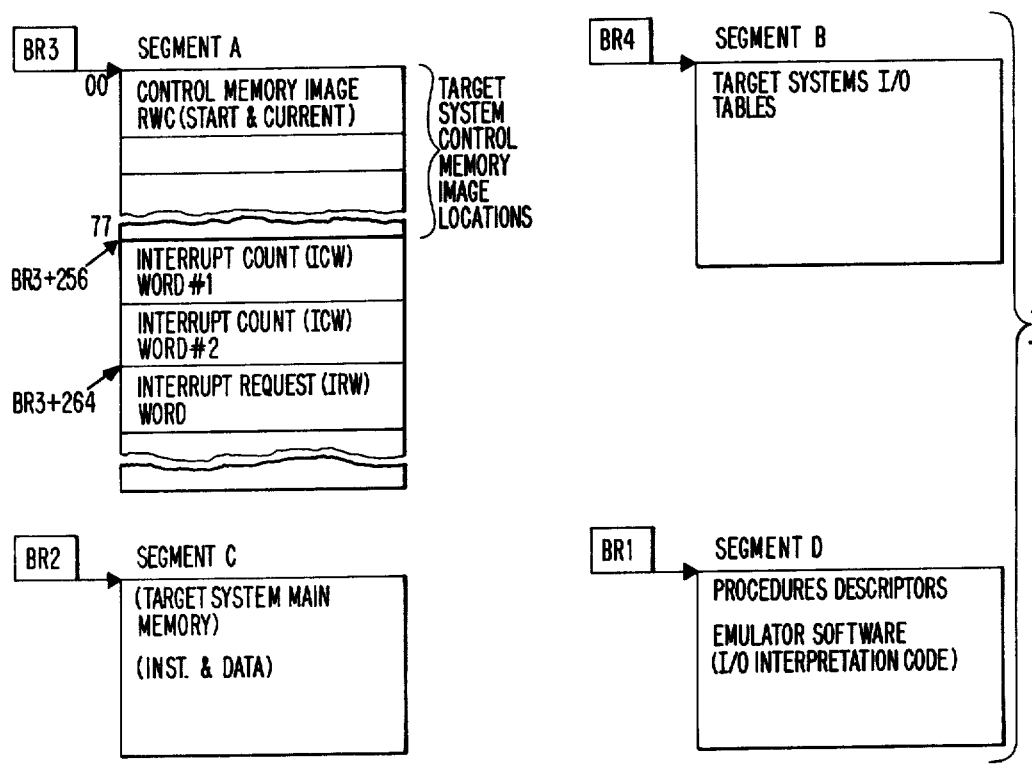
FIG. 1b illustrates diagrammatically the layout of the main store in accordance with the present invention.

MAIN STORE — FIG. 1b

An area which corresponds to the low end of the main store address space is reserved for use by the system hardware and firmware. The upper boundary or limit of this area is specified by the contents of a "boundary address register" (BAR) which is accessable to the system software. Generally, the contents of the BAR are set to a predetermined value at system initialization time. The area or space below the address specified by the contents of the BAR normally contains tables used by the IOC which define the particular peripheral subsystem configuration, and firmware instructions for controlling the operation of the CPU. As seen from FIG. 1b, memory is divided up into a plurality of segments which are accessable by a given process definable by the operating systems software.

The main storage can be characterized as a segmented virtual memory in which the addresses of programs are data represented by the name of the segment in which they reside and a displacement within that segment. Protection "rings" are associated with the segments and protect the content of the segment from accesses. Also, the protection rings to which the segment belongs are part of the data associated with the segment. For additional information as to the implementation of virtual memory and program protection, reference may be made to the publication titled "The Multics Virtual Memory" published by Honeywell Information Systems Inc., Copyright 1972.

The main store emulator information and data structures as seen from FIG. 1b include a plurality of segments (A through D). Segment A is coded to store an image of the target system control memory. As such, it contains the processing registers (e.g. read-write counters — starting and current). Additionally, the segment includes several control words ICW1, ICW2 and IRW used in handling interrupt operations as explained herein. Segment A is identified to the system by the contents of base address register 3 (BR3). Segment B includes the input/output tables organized in accordance with the present invention. This segment is accessed by the contents of base address register 4 (BR4).

The target system main memory is allocated to segment C and the segment is identified to the emulation system by the contents of base address register 2 (BR2). The segment size is arranged to be equal to the memory size of the target system being emulated. Given an absolute address M or a character, that character would be located by indexing the contents of BR2 by M. In the preferred embodiment, the format of the information contained in main memory corresponds to the format of the information utilized by the target system. That is, both systems utilize a "character" which contains 8 bits, 6 data bits and 2 punctuation bits (i.e. a word mark bit — bit 1 and an item mark bit — bit 0). The only difference between the way information is represented in the host system is in the numbering of the bits from left to right as 0 through 7 instead of from right to left as 1 through 8.

Segment D includes the tables and routines for handling those functions not being carried out by the hardware or firmware of the system. For example, the software portion, emulation support package, (ESP), is operative to translate and execute input/output orders of the target systems. Also, it can simulate various hardware portions of the target systems architectures as well as certain operations heretofore performed by the target systems as explained herein.

Of course, it will be appreciated that actual execution of the input/output operations proceed through the I/O structure of the host system. The tables included in segment D, for example, contain peripheral addresses used by the target systems and which correspond to the I/O system for a particular configuration under emulation. Other tables are used to record the status of a particular transfer, its control unit/device address as well as the status for all read/write channels of the target system.

Figure 1C:
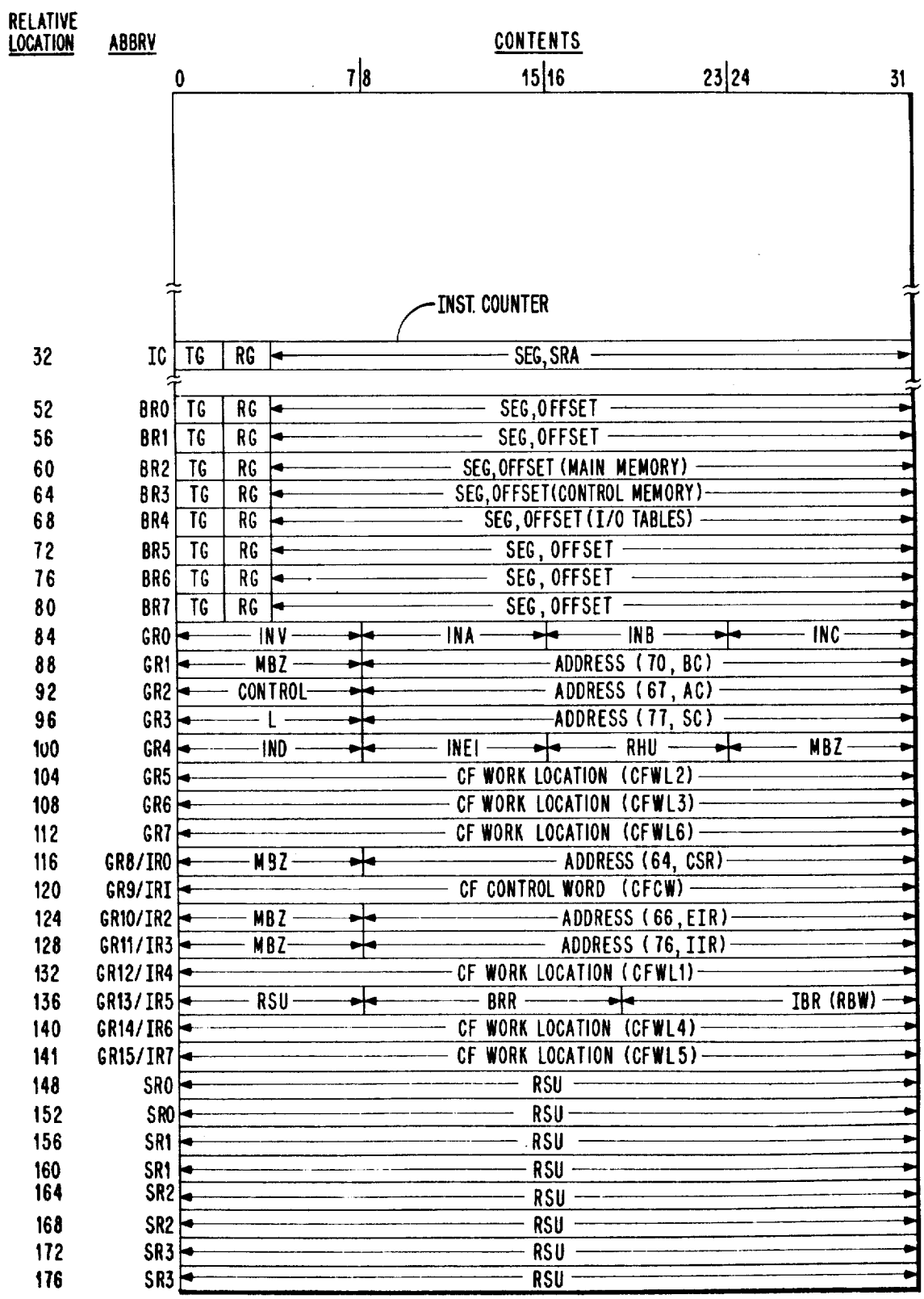
FIG. 1c shows the layout of the process control block included within the main store of FIG. 1.

Although not shown in FIG. 1b, there is a segment or portion of a segment in the main store which contains the process control block (PCB). The PCB contains the relevant information required to running or operating a given process. The type of information contained within a PCB is illustrated in FIG. 1c. As seen from the Figure, this information is all that is required to enable the system of FIG. 1 to emulate a particular target machine. The contents of the PCB will be described herein in connection with the present invention.

DETAILED DESCRIPTION OF THE CPU SUBSYSTEM

CONTROL STORE INTERFACE ADAPTER (CIA) AND CONTROL STORE UNIT (CSU)

FIG. 2a

The control store array 205-1 of the CSU in the preferred embodiment includes both fixed and alterable sections. The fixed section can be constructed using a programmable read only memory (PROM) and the alterable portion of the memory includes integrated circuit read/write memory. The entire memory is addressable via an address register KS and its upper portion is alterable so as to provide capabilities for controlling the system in a variety of different modes. One such mode is that utilized in emulating the operation of a number of different target systems. Another includes diagnostic capability for diagnosing which system portion or portions may have failed. In the present embodiment, the control store array has a size of 7K ($K = 1024$ bits) and the width of each control store word is 84 bits. The control store array is divided into the following sections: 1K for microdiagnostics; 2K for emulation; and 4K for native mode operation. It will be obvious that the control store locations which comprise a given section can be either contiguous or non-contiguous. The 1K used for microdiagnostics is dynamically alterable as well as portions used for emulation and native mode operation. The remaining locations of the control store are non alterable or fixed.

Each control store word is divided into a plurality of fields. A first field termed an E field is a branch control field which identifies the type of branch to be taken. The select circuits 204-1 through 204-7 of the CIA use the fields of a microinstruction word to generate branch addresses. For further information regarding the coding, reference may be made to the aforementioned Hirtle patent application.

In the absence of a branch operation, the control store during a cycle of operation is addressed by the contents of the KS address register 204-9 and the contents of the addressed location are read out into a plurality of data latches 205-2. Thereafter, a portion of the output signals (i.e. bits 26–79) from these latches are distributed or transferred to storage registers (not shown) included within each of the units of the CPU subsystem. Each such unit includes decoding logic circuits (not shown) which take the form of programmable read only memories (PROM) which produce the requisite subcommand control signals for their respective unit. In this manner, each unit can combine the control signals provided by its "PROM", divide these signals into groups for combination with other signals generated within that unit as required for performing various operations. The decoder circuits 205-4 decode certain fields (e.g. branch fields) and generate signals required for sequencing operations.

Figure 2A:
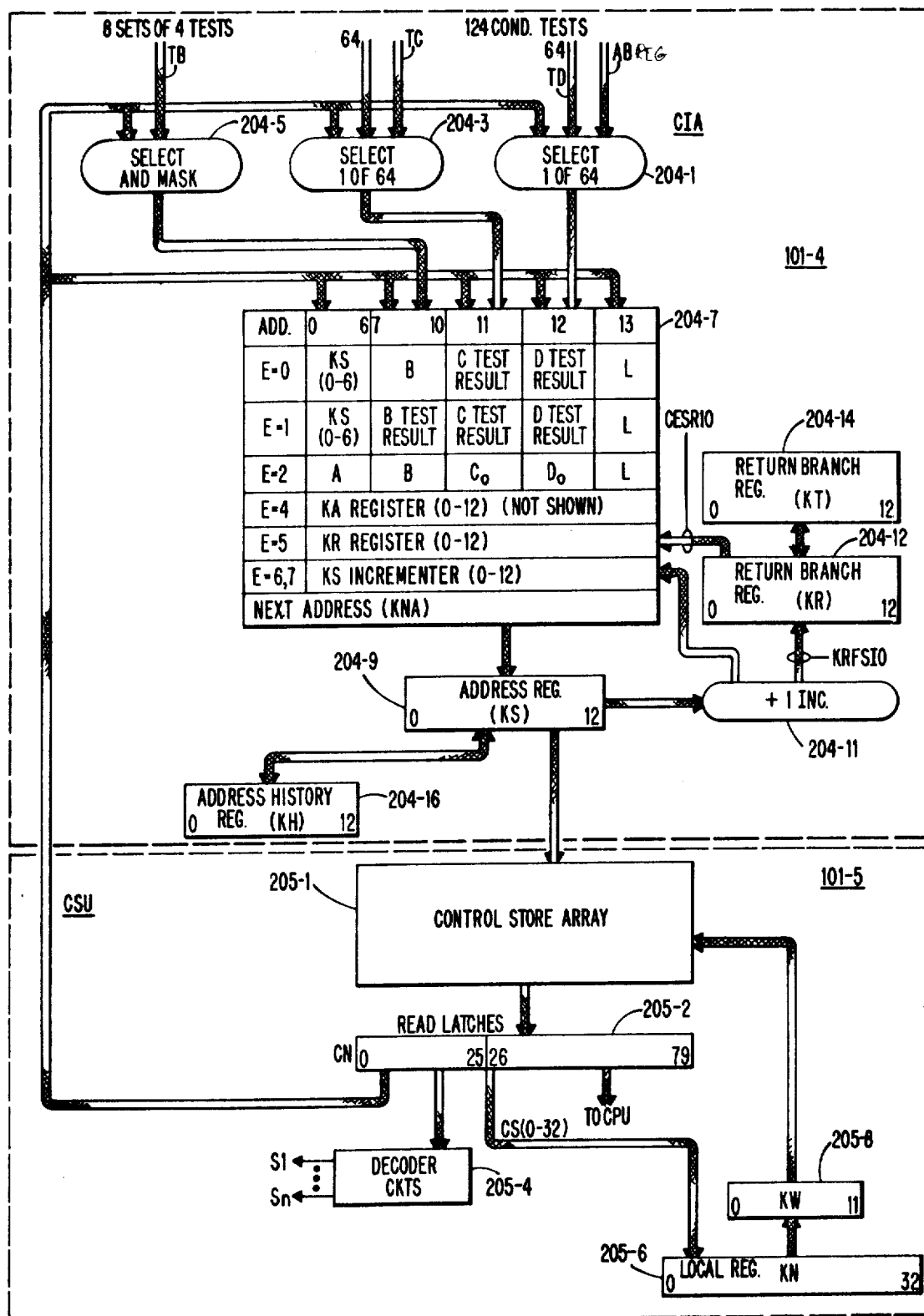
FIG. 2a shows in greater detail the control store interface adapter (CIA) and the control store unit (CSU) of FIGS. 1 and 1c.

Also, as seen from FIG. 2a, the control store unit includes a local register KN 205-6 which couples via register KW 205-8 to the control store array 205-1. This arrangement enables the writing back into an addressed location the information read out during a memory cycle of operation. Because of the register size, the information read out is written back into the control store array 12 bits at a time.

Figure 2B:
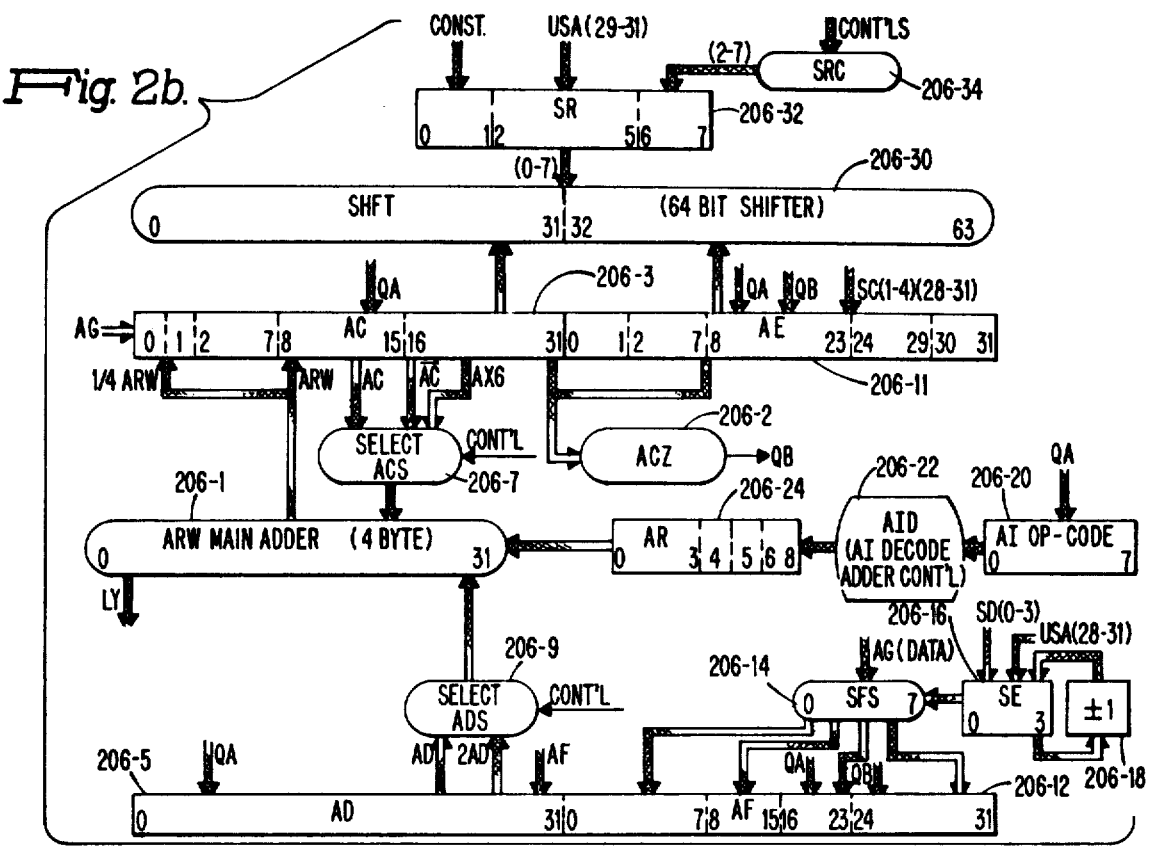
FIGS. 2b–2c show in greater detail the different portions of the ALU of FIGS. 1 and 1c.
Figure 2C:
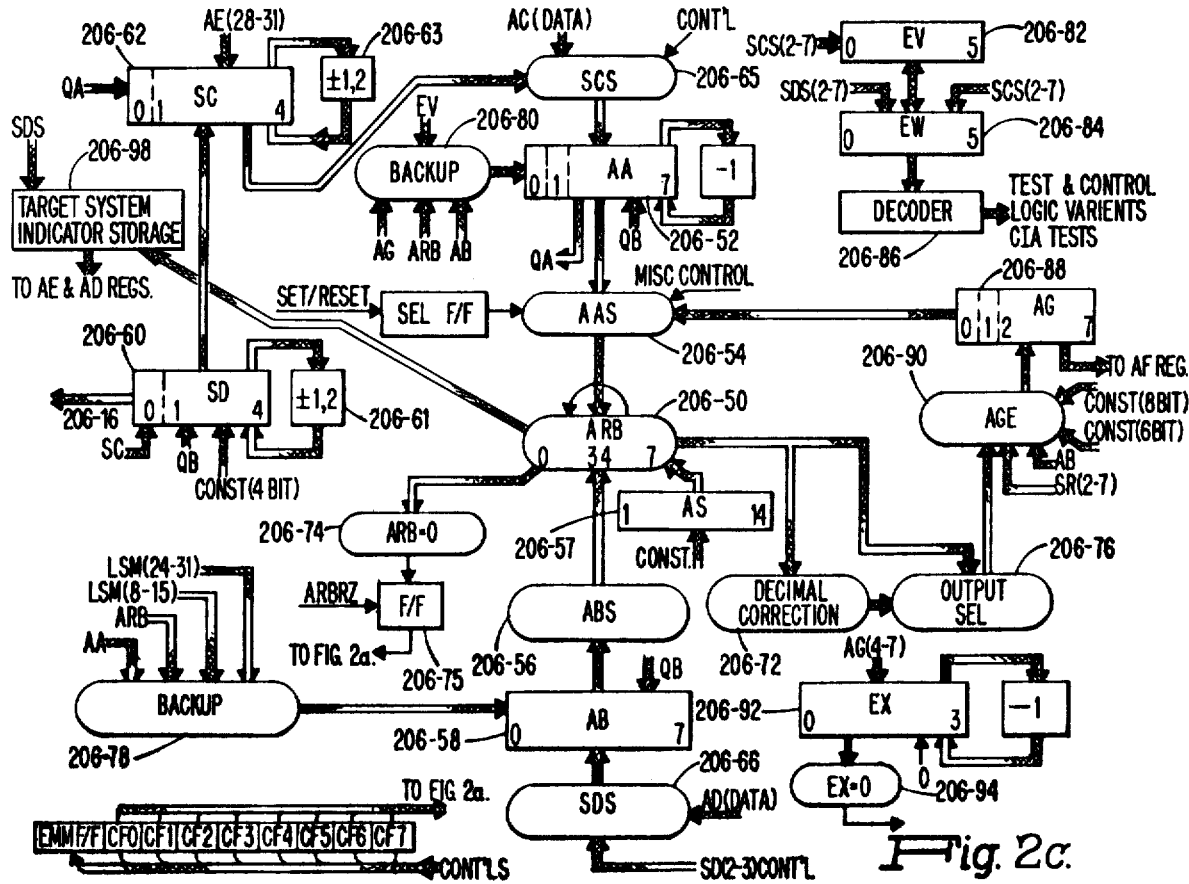

ARITHMETIC AND LOGIC UNIT — FIGS. 2b–2c

This unit which is shown in block diagram form in FIG. 1c performs all the required arithmetic and logic operations for the CPU subsystems. The unit includes a word ALU 206-1 shown in FIG. 2a, which performs arithmetic and logical operations upon a pair of operands which have a length of 4 bytes and are stored in a pair of operand registers 206-3 and 206-5. The contents of the operand registers 206-3 and 206-5 are applied via select circuits 206-7 and 206-9, conventional in design. The output result signals generated by word adder 206-1 are applied to register 206-3 and to register LY. A decoder circuit 206-2 tests the AC register for zeros.

A pair of registers 206-11 and 206-12 serve as auxiliary registers and couple to the elements and buses indicated. The AF register 206-12 also receives data signals from an AG register 206-88 via SFS selector circuit 206-14 in response to control signals from a three stage counter 206-16. The SE counter 206-16 is incremented/decremented by 1 via incrementer/decrementer circuit 206-18. This counter is loaded from registers included in the byte adder and in the CIA unit.

As explained herein, a plurality of interrupt logic decoder circuits, not shown, couple to the AE and AF registors 206-11 and 206-12 and are operative to decode the contents of the registers on a byte basis. The outputs of the decoder circuits couple to a plurality of sector interrupt flip-flops which can be considered as a part of the indicator storage for the purposes of the invention.

Also, the ALU includes an AI op code register 206-20, decoder circuits 206-22 and mode control register 206-24 arranged as shown. The contents of register 206-24 condition the adder to perform the operation designated by the op code of an instruction. Also, the ALU includes a 64 bit shifter 206-30 which couples to the AC and AE registers 206-3 and 206-11 and is controlled by an 8 bit control register 206-32. The register 206-32 is loaded directly from the sources shown or indirectly via a selector circuit 206-34.

As seen from FIG. 1c, the ALU includes an 8 bit (byte) adder 206-50 which is shown in greater detail in FIG. 2c. For the purposes of the present invention, the adder 206-50 can be considered conventional in design. The adder 206-50 operates on operands a byte at a time and includes decoding logic circuits which perform those operations required by the target systems. Additionally, the adder includes decimal correction circuits 206-72, zero result decoder circuits 206-74, output flip-flop 206-75, and output selector circuits 206-76. Also, the adder 206-50 includes a plurality of storage registers which couple to the common bus QA and QB and to one another as shown in FIG. 2c. It is seen that a register 206-58 couples to the common data/control bus QB and to sources designated LSM, AA and ARB via circuits 206-78. The source LSM is included within the local store unit 101-7 of FIG. 1. This memory provides temporary storage for the ALU as well as temporary storage for control information and address information pertinent to processing of a particular instruction. The sources AA and ARB correspond to the register 206-52 and byte adder 206-50 respectively. The register 206-52 couples to both the QA and QB buses and to the AC register 206-3 via a selector 206-65.

As seen from FIG. 2b, the AA and AB registers 206-52 and 206-54 primerily serve as A and B operand registers which couple to the byte adder 206-50 by way of the AAS and ABS selector circuits 206-56 and 206-58 respectively. A mode control register 206-57 directly couples to the adder 206-50 and the contents of the register condition the adder to perform the operation specified by a constant loaded into the register. The AB register 206-52 receives a designated one of 4 bytes stored in the AD register of the word adder. The particular byte selected is defined by the contents of SD counter 206-60 which includes incrementer/decrementer circuit 206-61. The counter contents serve as a pointer designating one of the bytes to be next loaded into AB register 206-58. Similarly, the SC counter 206-62 including an incrementer/decrementer circuit 206-63 serves as a pointer for designating which byte to be loaded into the AA register 206-52 from the AC register 206-3 of the word adder. That is, the SD and SC counters condition selector circuits 206-65 and 206-66 respectively to load the AA and AB operand registers from the AC and AD registers. Also, the AB and AA registers 206-58 and 206-52 can be loaded via gating circuits 206-78 and 206-80. The selector circuits 206-65 and 206-66 can load a pair of control registers 206-82 and 206-84. These registers provide temporary storage for certain variant control characters of an instruction being processed (e.g. op code and C1 characters). A decoder circuit 206-86 couples to register 206-84 for decoding the bits of the C1 character.

The storage registers include a further register 206-88 which is used to perform certain masking operations wherein signals are loaded into the register via a selector circuit 206-90 and in turn applied to byte adder 206-50 via selector circuit 206-54. Also, register 206-88 is used to load a three stage decrementing counter 206-92. This counter is used to keep track of the number of control characters processed by the emulator. The counter also includes a decoder circuit 206-94 which signals when the counter decrements to zero.

Additionally, the byte adder 206-50 includes a plurality of flip-flops utilized by the host system for control and storage purposes. One such flip-flop is an emulation mode flip-flop 206-80 which is settable and resettable by firmware. Other flip-flops include a plurality of control flip-flops CF0 through CF7 which couple to the control store test circuits of FIG. 2a.

The byte adder also includes a plurality of target system indicator bistable storage elements, the outputs of which are applied to the AE and AF registers of the word adder. These storage elements are connected to receive signals from the SDS selector circuits 206-66 and the byte adder result sense logic circuits as shown.

ADDRESS CONTROL UNIT

The ACU 101-2 of FIG. 1c includes an associator 202-1 which stores segment number information of up to 16 segment descriptors used in developing the absolute address of a desired segment. Also, the ACU includes an unit register file (URF) 202-20 which includes a plurality of 32 bit wide base register locations BR0-BR7 in addition to work register locations UW4 through UW7. Certain ones of these registers normally contain base register addresses derived from an instruction or microinstruction etc. applied via the QA and QB buses.

I/O TABLES — FIG. 1e

Before describing the operation of the present invention, reference will first be made to FIG. 1e which discloses the organization of the I/O tables in accordance with the present invention. In the present embodiment, as seen from FIG. 1e, there are six general classes of tables. These include: a read/write channel table; a sector table; a termination table; peripheral control unit tables; PCU extension tables; device tables and device extension tables.

READ/WRITE CHANNEL TABLE

The read/write channel (RWC) table is organized on a per emulated target system basis. That is, there is one such table for each emulated system. The contents of base address register 4 (BR4) designates the beginning or base of the RWC table.

Figure 3A:
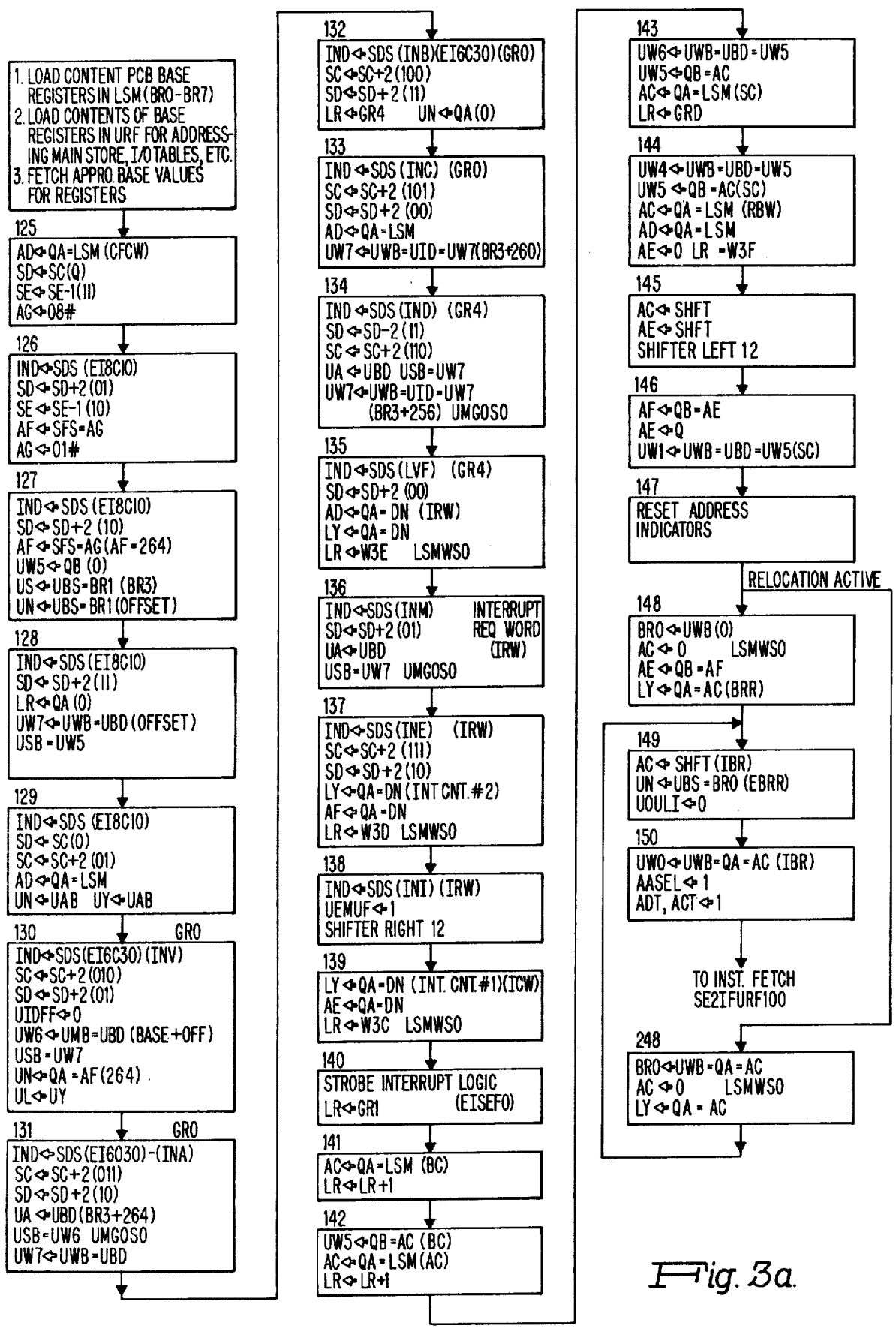
FIG. 3a is a flow chart of a target system emulation process load routine in accordance with the present invention.

Each table includes an address space of 256 bytes. These bytes are grouped into 64 entries, one entry for each possible read/write channel code that can be specified by a target system program. Each entry is coded as illustrated in FIG. 3a. Referring to that Figure, it is seen that each entry contains a six bit time slot mask field, a six bit counterd code field, a single extended I/O bit (EXT), a 3 bit sector code field and a 16 bit RWC busy mask field. FIG. 3a also shows an example of an RWC field entry specified for a particular target system. As seen from the Figure, a maximum of six time slots can be represented in an emulated target system (i.e. time slots 1, 1a through 3a). In this example, two time slots are required by the RWC code and correspond to a data transfer rate of 167 characters per second (CPS) in the target system. However, this field does not indicate what time slots are busy.

The counter code corresponds to the address in OCTAL of the current location counter used for address storage by a data transfer instruction with the designated RWC code. In this example, the counter code address is 22 (OCTAL). The code normally has a value in the range 00 OCTAL to 27 OCTAL.

Any read/write channel code which is illegal for the emulated configuration is designated as such by the counter code entry. For the RWC entry corresponding to a code of 00 OCTAL and for all RWC entries corresponding to RWC codes which are illegal in the target systems, the counter code field is coded with a high order bit of ONE (i.e. 1XXXXX). This counter code is treated in a special manner. Whenever the emulator detects a counter code with a high order bit of "ONE" detected during the processing of a data transfer input/output instruction, it generates a specification message signaling the ESP.

The "EXT" bit is zero which means that the extended I/O facility is not used and the entry fetched is used in processing the instruction. When this bit is set to a binary ONE, it indicates that it may be necessary to use an "effective" RWC code instead of the specified RWC code depending upon the status of an extended I/O target system indicator. If the indicator is a binary ONE (i.e. ON), the information in the current entry is used. If the indicator is a binary ZERO, the information in an alternate entry is fetched and used. For those target systems which do not have this type of capability, this bit will always be set to a binary ZERO. The facility afforded by this feature is described in greater detail in the above referenced programming manual.

The physical sector associated with the RWC code is sector 2 as indicated by bits 13–15 of the sector field. In the case of control types of I/O instructions which require no data transfer and which contain only a C1 control character, the sector code bits 13–15 are used to fetch a correct time slot status entry as explained herein. In such cases, a test of a read/write channel implies a test of the sector time slots. The reason is that there is a fixed relationship between the sector, a time slot and the selected RWC in the target systems. However, in the case of an instruction which requires a data transfer (e.g. a PDT instruction), the sector code bits are not used.

The 16 bit RWC busy mask field is used to indicate which read/write channels are required to be made busy (i.e. must be available for a data transfer instruction) or are to be tested (i.e. a control instruction). As illustrated in FIG. 3a, a target system can have a maximum of 16 read/write channels designated as shown. The letter A defines an auxiliary channel as contrasted from a primary channel. In some target systems, there is a fixed relationship between the read/write channels and time slots. In order to achieve higher transfer rates which require more than one time slot, read/write channels are "interlocked" which means that more than one channel and hence counter, is required to execute the instruction. In the example given, since two time slots are required for the 167 CPS rate, two read/write channels are also required. Thus, the RWC busy mask field is coded to specify read/write channels 5 and 5a.

SECTOR TABLE

Figure 5A:
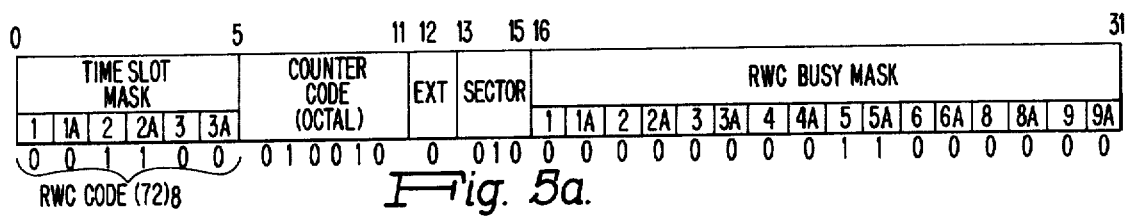
FIG. 5a shows the format of a read/write channel table entry.
Figure 5B:
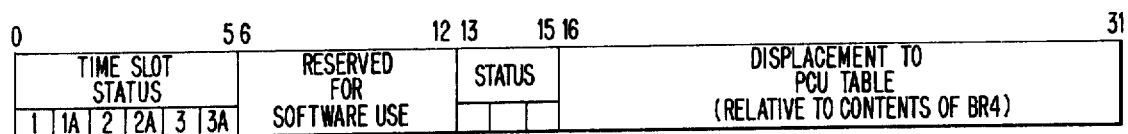
FIG. 5b shows the format of a sector table entry.

Another type of table included within FIG. 1e is a sector table. One sector table as shown is present for each target system being emulated. The sector table has an address space of 32 bytes which as shown in FIG. 1e follows the last byte allocated to a RWC table. The sector table entries are coded as illustrated in FIG. 5b. As seen from FIG. 5b, the sector table entry includes a time slot status field (bits 0–5) which is coded to indicate which time slots on the sector are currently in use (i.e. "busy" status of all the sector time slots). A 7 bit field (i.e. bits 6–12) is reserved for use by the emulator software (ESP). The sector table entry also includes a three bit status field (i.e. bits 13–15) wherein bit 13 when a binary ONE indicates that the sector does not exist for the particular target system (i.e. non-existent). Bits 14 and 15 of the status field are reserved for future use. The last field (i.e. bits 16–31) of the sector entry is a 16 bit displacement field which defines the base location of the peripheral control unit (PCU) table for the sector relative to the location specified or pointed to by the contents of base register 4.

An unique entry in the sector table is defined by adding to the contents of base address register 4, a value of $256_{10}$ plus a value of 4 times the sector code where the sector code corresponds to a three bit field formed as follows: (a) if the first variant character C1 is the only variant character present in the instruction, the sector code is taken from the RWC entry referenced by the C1 character (control input/output instructions only – PCB); (b) if the variant characters C1 and C2 are present in the instruction, the sector code is formed by taking the high order three bits of the C2 variant character and setting the high order bit to a binary ZERO; (c) if the instruction includes a variant character C1 and an escape code character with or without the C2 variant, the sector code is formed by taking the low order three bits of the CE character. This will be explained in greater detail herein with reference to FIG. 6.

PERIPHERAL CONTROL UNIT TABLE

The peripheral control unit (PCU) is a third type of table included in FIG. 1e. There is only a PCU table present for each sector in the target system being emulated. Also, there is one entry in the table for each possible PCU address that can be specified by a target system program. Thus, there are 16 entries in the table, each having 4 bytes.

Figure 5C:
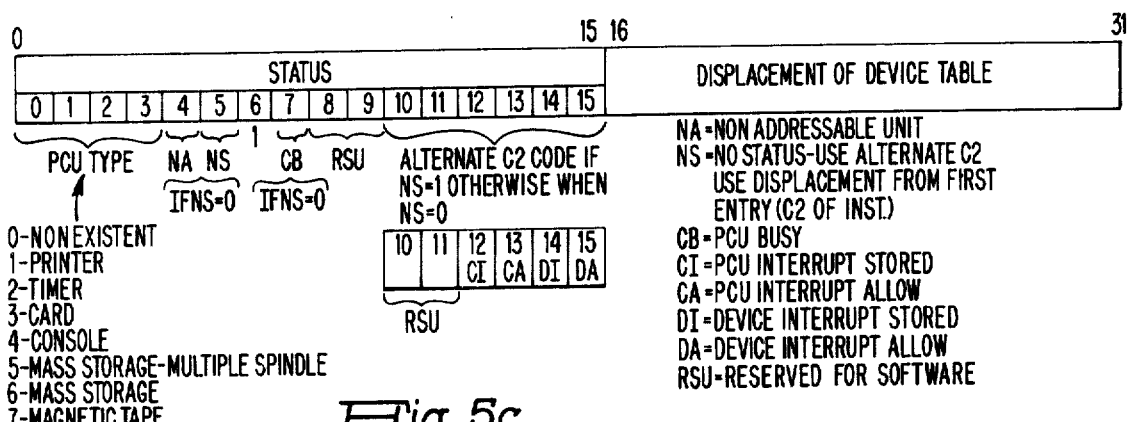
FIG. 5c shows a format of a peripheral control unit (PCU) table entry.

The format of the PCU table is as illustrated in FIG. 5c. As seen from FIG. 5c, the entry includes information as to the type of PCU, the existence of the PCU and its busy/interrupt state. More specifically, a code of zero indicates that a peripheral control unit does not exist for this PCU address code. When the first four bits are coded as 0001, this value indicates that a target system printer control unit is being emulated. When these bits are coded as 0010, this value indicates that a target system timer or clock is being emulated. Similarly, when coded as 0111, this value indicates that a target system magnetic tape control unit is being emulated and when coded as 1000 through 1111, these values are used to indicate that the peripheral control unit being emulated is to be treated as a Special Unit. As explained herein, whenever a Special Unit code is detected, the emulator immediately traps the instruction to the ESP for all further processing.

Bit 4 when set to a binary ONE indicates that the peripheral control unit is not temporarily available or addressable. When this bit is a binary ONE, the PCU busy bit (CB) which corresponds to bit 7 is also set to a binary ONE. Bit 5 is a no status bit which when set to a binary ONE indicates that no status is present in bits 4 and 7–15 of this entry and that bits 10–15 contain an alternate C2 code which indicates the PCU table entry in which the desired information is located (on the same sector). In this instance, bits 4 and 7–11 are reserved for software.

When bit 5 is set to a binary ZERO, then bits 4 and 7–15 contain the status. In all instances, the displacement value of the device table field and the PCU type field are valid and bit 6 is set to a binary ONE. When bit 7 is set to a binary ONE, it indicates that the target system PCU being emulated is busy. Bits 8 and 9 are reserved for software use while bits 10 through 15 specify an alternate PCU or interrupt status depending upon the state of bit 5. More particularly, when the NS bit 5 is a binary ONE, this field contains another or alternate C2 code for the sector specified by the instruction. This alternate C2 code is processed in the same way as the C2 code of the instruction to obtain the address of the table entry which contains meaningful status information. The purpose of this arrangement is to be able to emulate target system peripheral control units which use more than one PCU address because they have more than one device attached but which can only support or control only one I/O operation at a time (e.g. non-simultaneous magnetic tape controllers, card reader - punch controllers). Thus, there are two entries in the PCU table which are addressed by a single PCU code and which share a common busy status bit interlocking the operations associated with the two entries as explained in greater detail herein.

If bit 5 is set to a binary ZERO, the field contains interrupt status defined as follows: bits 10 and 11 are reserved for software use; bit 12 is a control unit interrupt bit which when set indicates that the control unit interrupt function is set for the target system PCU in question; bit 13 is a control unit allow bit which when set to a binary ONE indicates that the PCU allow interrupt function for the target system PCU is turned on (i.e. interrupts are allowed); bit 14 is a device interrupt bit which when set to a binary ONE indicates that the device interrupt function for the target system PCU is turned on (i.e. a device interrupt is stored); bit 15 is a device interrupt allow bit which when set to a binary ONE indicates that the device interrupt allow function is turned on in the emulated control unit (i.e. device interrupts are allowed); and bits 16 through 31 are displacement bits which define the base location of the device table for the PCU relative to the location specified by the contents of base address register 4.

Since the termination table, PCU extension tables, device tables and device extension tables are not necessary in explaining the operation of the present invention, they will not be discussed herein. However, for further information about these tables, reference may be made to the aforementioned Hirtle application.

As seen from FIG. 1b, segment A which contains an image of the target system control memory is allocated up to the first 64 words referenced by the contents of base relocation register 3 (BR3) of the PCB. Segment A includes a number of storage locations, not shown, used in handling those functions performed by hardware/microprogrammed target system. As indicated briefly, the CPU hardwaremicroprogrammed portion referred to herein as the compatibility feature (CF) circuits execute directly most target system instructions. This portion of the system is normally activated in response to a start instruction to a "process" or an Execute Decor Extension (EXDE) instruction coded to place the system in the compatibility mode of operation.

The ESP as mentioned previously performs the functions involving the translation and execution of input/output instructions. The ESP can be considered as a process group in the system of FIG. 1. As mentioned, the ESP calls the compatibility feature circuits by the use of a start instruction or an extended decor instruction accompanied with a mode change command. When the start instruction is used, the process under which the compatibility feature runs is separate from the ESP process which initiates it. In the case of an extended decor instruction, the target system process is the same as the ESP process which initiates it but the CPU operates in the target system mode. Therefore, before executing the extended decor instruction, the ESP initializes its own registers to the content and format illustrated by the coding of the PCB of FIG. 1c. For the purpose of the present invention, the initialization of vairous parts of the system can be considered to be performed in a conventional manner.

The compatibility feature is indicated calls on the ESP to perform some of the I/O operations required by the target system process. For example, events stored as a result of executing target system channel programs are forwarded to the ESP event handler process. This process updates the I/O tables and certain control words which include an interrupt request word and interrupt count word of segment A of FIG. 1b. When the compatibility feature circuits require service by the ESP, it is operative to store target system status in the general registers and generate the appropriate parameters including a service class number, SCN. When the host system switches out of the compatibility mode, it fetches an interrupt count word ICW using so-called host or native instructions.

INTERRUPT GENERAL REGISTER AND CONTROL WORDS

Figure 1D:
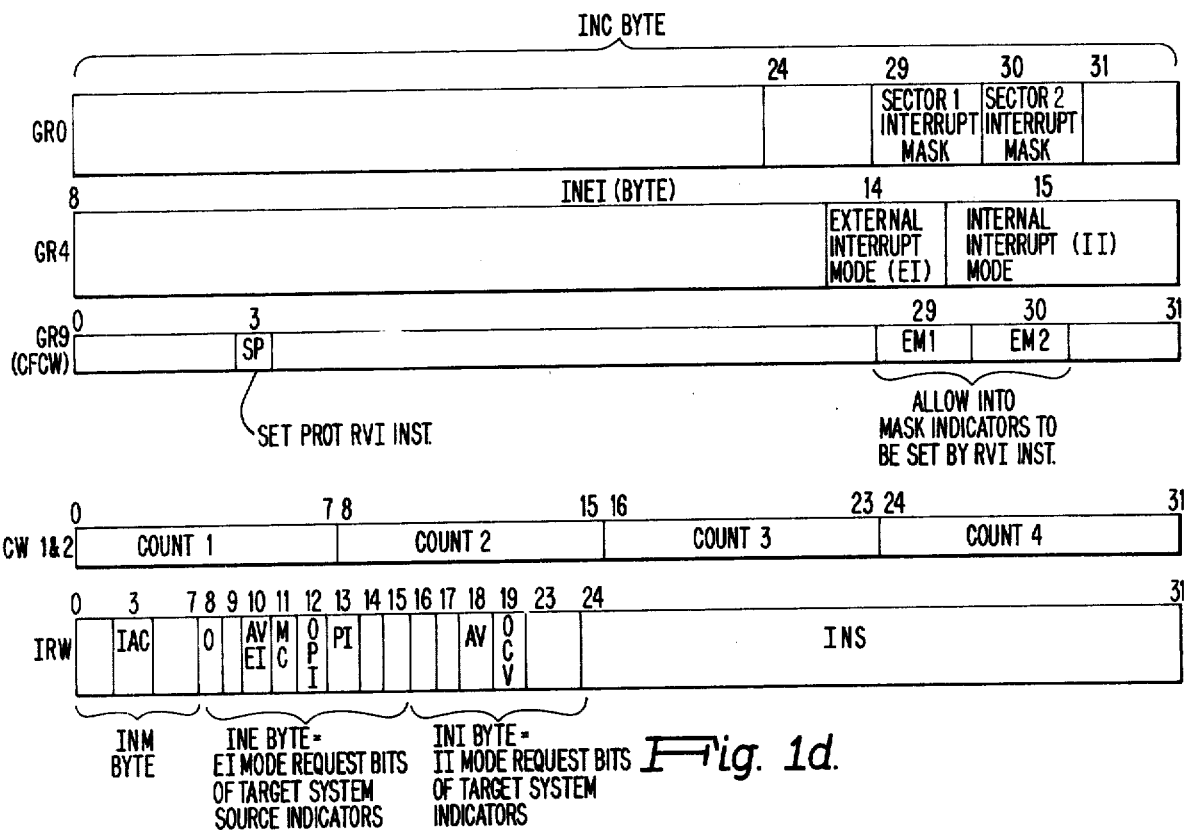
FIG. 1d shows in greater detail the coding of certain ones of the control words and general register words of the PCB.

FIGS. 1c and 1d show in greater detail the coding of certain ones of the control words stored in the main store, some of which constitute part of the PCB. The various words shown are involved in the handling of target system interrupt processing operations. The first word corresponds to general register 0 (GR0) which is shown in FIG. 1c as including several bytes. The last or fourth byte designated as an INC byte is shown in greater detail in FIG. 1d for the purpose of delineating sector interrupt mask bits. There is one such bit for each sector contained within the INC byte. The mask bits are coded to represent the state of target system indicators. The states of these bits define when a sector is permitted to cause the generation of a peripheral interrupt (PI) bit signaling that an interrupt is outstanding on one of the sectors of the target system.

The next word corresponds to GR4 which includes an INEI byte shown in greater detail in FIG. 1d which contains an external interrupt (EI) mode bit and an internal interrupt (II) mode bit. In the target system, as described in the above reference programming manual, an external interrupt signal generated by sources including control panel or console, a monitor call instruction or a peripheral control, sets target system indicators to show the source and the type (external) of interruption.

An internal interrupt signal is generated in the target system by a storage protection violation (e.g. internal interrupt address violation, op code violation, etc.). Again, target system indicators are set by this signal to show the cause and the type (internal) of interruption. The target system processor normally enters external interrupt and internal interrupt modes of operation to respond to these interrupt signals.

General register 9 also includes several bits relating to the interrupt process. The first bit designated as "SP" is set by the compatibility feature circuits to allow various indicators to be set in response to one of the interrupt control target system instructions designated as a restore variant and indicators (RVI) instructions. Normally, this bit will be set to a binary ONE. The next bits, only two of which are shown, are enable mask bits designated EM1 and EM2. These bits are used by the compatibility feature circuits to enable the sector interrupt mask indicators to be set in response to the RVI target system instructions. For purposes of the present invention, these bits can be assumed to be set to binary ONES.

In performing operations relating to interrupt processing, the compatibility feature circuits and the ESP communicate through several control words of information which include the pair of interrupt count words and the interrupt request word, all of which are contained within segment A of FIG. 1b. As shown in FIG. 1e, each of the interrupt count words (ICW 1 and 2) contains byte sized counters which indicate the number of interrupts outstanding on the target system sector buses. The ESP of the event handler process is operative to increment the interrupt counts as explained herein. Interrupt counts are decremented by the compatibility feature circuits of ESP as mentioned. The interrupt request word (IRW) is used to save interrupt requests and provide a means by which the compatibility feature circuits communicate changes in the interrupt request states to the ESP. The state of the interrupt request word is examined by the compatibility feature circuits whenever an EXDE instruction is executed placing the system in the compatibility mode. As seen from FIG. 1d, there are several bits specifically related to interrupt processing. One bit designated "IAC" is an interrupt actuator bit which when set to a binary ZERO renders the compatibility feature circuits temporarily insensitive to interrupts and events. This bit is normally set to a binary ONE. There are several bits in an INE byte which correspond to the external interrupt mode request bits of the target system source indicators mentioned previously. These include an AVEI bit, a MC bit, an OPI bit and a PI bit which when set to binary ONES, signal the occurrence of an address violation, a monitor call instruction, an operator panel interrupt and a peripheral interrupt respectively. The INI byte contains internal interrupt mode bits of the target system indicators, only two of which are illustrated. An AV bit and an OCV when set to binary ONES signal the occurrence of an address violation and an op code violation respectively.

DESCRIPTION OF OPERATION

With reference to FIGS. 1, 1a–1e, 2, 2d, 5a–5c and 6, the operation of the system of the present invention will be described in connection with the flow charts of FIGS. 3a–3e and 4a–4b. The operation will be described with reference to an example illustrating the manner in which the host system processes target system interrupts in accordance with the present invention. There are several specific times when the CPU operating in the compatibility mode checks the status of the interrupt counter registers of each sector bus to determine whether or not it is required to perform interrupt processing. This occurs after a process load operation when the CPU is conditioned to operate under control of the compatibility feature circuits and during the processing of certain target system interrupt processing instructions including a set variant indicator (SVI) instruction and a resume normal mode (RNM) instruction. For further information regarding these target system instructions, reference should be made to the aforementioned programming manual.

The two interrupt count words (ICW1 and ICW2) stored in the control memory segment (segment A) are updated by the ESP at the termination of peripheral input/output instructions when interrupt allow indicators in the I/O tables are set to the binary ONES allowing interrupts to be generated by designated peripheral devices. For the purpose of the present invention, these indicators are "ON" to allow interrupt processing by the CPU.

FIG. 3a illustrates the process load operation routine. The initial microinstructions, not shown, when executed cause the loading of the contents of the general register locations of the PCB into corresponding storage locations of the LSM for immediate reference. Another group of microinstructions, not shown, load the appropriate values for the base register locations of the URF for addressing the various parts of main store, control memory and the I/O tables during the execution of a target system program. Also, other microinstructions are included for fetching the correct base register contents from either the associator or from main store when the information does not reside in the associator. For the purpose of the present invention, the above operations can be considered to be housekeeping functions which are performed in a conventional manner. However, for additional information, reference may be made to the above mentioned co-pending patent applications.

Continuing on with the description when the process load operation is performed, further microinstructions 125 through 130 are executed which cause the bytes comprising the CFCW indicator information coded as shown in FIG. 1d to be loaded a byte at a time via the SDS selector circuit of the byte adder. Specifically, the information is placed first in the AD register of the word adder and the SDS selector circuit is conditioned to select the appropriate byte which is then usually loaded into the AB register. However, instead of loading the byte into the AB register, the signals from the SDS selector circuits are loaded directly into the indicator storage circuits.

The appropriate indicator circuits are set in accordance with the byte information in response to subcommand signal EI8C10 generated by the microinstructions executed. The group of indicators set are defined by the contents of the SD pointer register which selects the byte and the particular storage flip-flops to be set. As indicted in FIG. 3a, microinstructions 131 through 138 when executed cause the storage of other indicator bytes in the appropriate flip-flops in response to subcommand signal E16C30.

Also, it is seen that the microinstructions 137 through 139 cause the two interrupt count words to be fetched from the control memory segment A of the main store. Specifically, microinstruction 137 when executed causes the first interrupt count word (ICW2) to be fetched and stored in scratch pad location W3d of the LSM. At the same time, the interrupt count word is placed in the AF register of the word adder. During the execution of microinstruction 138, an ACU mode flip-flop is switched to a binary ONE conditioning the ACU to provide for target system mode addressing instead of native mode addressing. As indicated, target system addressing is character sensitive and is also described in the aforementioned programming manual.

Following that, microinstruction 139 when executed causes the second interrupt count word (ICW1) to be fetched and stored in working location 3c of the LSM. At the same time, the count word is placed into the AE register of the word adder. When microinstruction 140 is executed, it generates subcommand signal EISEFO which strobes the interrupt logic circuits connected to the AE and AF registers of the word adder. These logic circuits include conventional decoder circuits which examine the contents of the AE and AF registers on a byte basis since the interrupt counts (which) are set up on a byte basis for the different sector buses. When any of the bytes has a value which is not zero, the signal EISEFO causes the switching of corresponding ones of the sector interrupt flip-flops to their binary ONE states signaling that an interrupt is outstanding on those sector buses. The binary ONE outputs of the sector interrupt flip-flops are "ORED" by an OR gate circuit which in turn generates a peripheral interrupt (PI) signal to be forwarded via a gate and amplifier circuit as one of the test inputs to the branch logic circuits of the control store of FIG. 2a.

It will be appreciated that the above operations causing the generation of the PI signal also could be performed by microinstructions which when executed examine the interrupt count words and based upon their values set a single flip-flop included within the compatibility feature circuits. The states of the various indicators establish conditions which cause the compatibility feature circuits to perform operations equivalent to those required in the target system such as maintaining an external interrupt condition in lieu of beginning the extraction of the next instruction within the program. When the compatibility feature enters the pre-extraction or prefetch routine, it performs a "trap branch operation" in which it executes a branch microinstruction causing a 64 way branch test operation. This results in the referencing of a specific one of the microprogram routines in the control store based on the states of the indicators as described herein.

Continuing on with the description, the execution of microinstructions 141 through 146 cause the "B counter", A counter and sequence counter contents to be loaded into the appropriate locations (i.e. locations UW4, UW6 and UW1 respectively) of the URF. Microinstruction 147 when executed causes the testing of the previously loaded relocation active flip-flop. When this flip-flop is set to a binary ONE indicating that relocation is active, the contents of the base relocation register (BRR) are required to be stored in the URF thereby providing reference to the "effective BRR address". The execution of microinstructions 248 causes the BRR and IBR values contained in the AC register to be stored in location BRO of the URF. When the relocation active flip-flop is set to a binary ZERO, then microinstruction 148 is executed which causes zeros to be stored in location BRO of the URF. Microinstruction 150 when executed causes the IBR value to be stored in location BRO of the URF and the switching of word adder flip-flops ADT and ACT (not shown) to binary ONES which provide for the selection of the AD and AC registers as word adder input sources in preparation for the instruction fetch operation.

At the completion of the process load routine, assuming that at least one sector bus interrupt count word contains a count of 1, the compatibility feature circuits will be operative to generate the PI signal. This is followed by the trap branch operation in which the compatibility feature circuits are caused to branch to an entry point within the control store for beginning the processing of an external interrupt. This causes the execution of microinstructions which cause the interchanging of the contents of the sequence counter with the external interrupt register contents and begins extraction of the instruction whose address was stored in the external interrupt register. Before extraction, the compatibility feature circuits set the external interrupt indicator to a binary ONE. The interrupt processing is assumed to process interrupts occurring on the same sector bus as the interrupted program. When this is not the case, interrupt processing sequence via the execution of interrupt control instructions (i.e. SVI and RVI) cause the storing and restoring of the appropriate sector bits. As mentioned before, each sector bus has associated with it an one bit mask. In the target system when the mask bit is set to a binary ZERO, interrupts from sources connected to that sector bus are accepted and processed. When the mask bit is set to a binary ONE, then interrupts are "held" or stored until the mask bit is altered or the interrupt function is reset. Interrupts from the operator control panel and monitor calls are never masked in the target system. Also, the depression of an initialize button on the control panel causes all mask bits to be reset to ZEROS. The execution of a SVI instruction causes the mask bits to be stored while the execution of a RVI instruction causes the mask bits to be restored or set as explained further herein.

In the target system, the interrupt signal generated by a PCU continues until a peripheral data transfer (PDT) instruction is issued to the PCU, a peripheral control and branch (PCB) instruction is issued which turns off the PCU's interrupt function or the CPU is initialized. Accordingly, the compatibility feature circuits under control of the target system program begin interrupt processing by executing a SVI instruction. At this time, the states of the various indicator storage flip-flops required for subsequent return to the interrupted program as well as information required to identify the interrupt source are stored in an appropriate area of main store. Next, the compatibility feature circuits under control of the target system program issue a PCB instruction to the PCU for turning off the interrupt function or causes a PDT instruction to be issued to the PCU when there is one for that PCU.

Figure 3B:
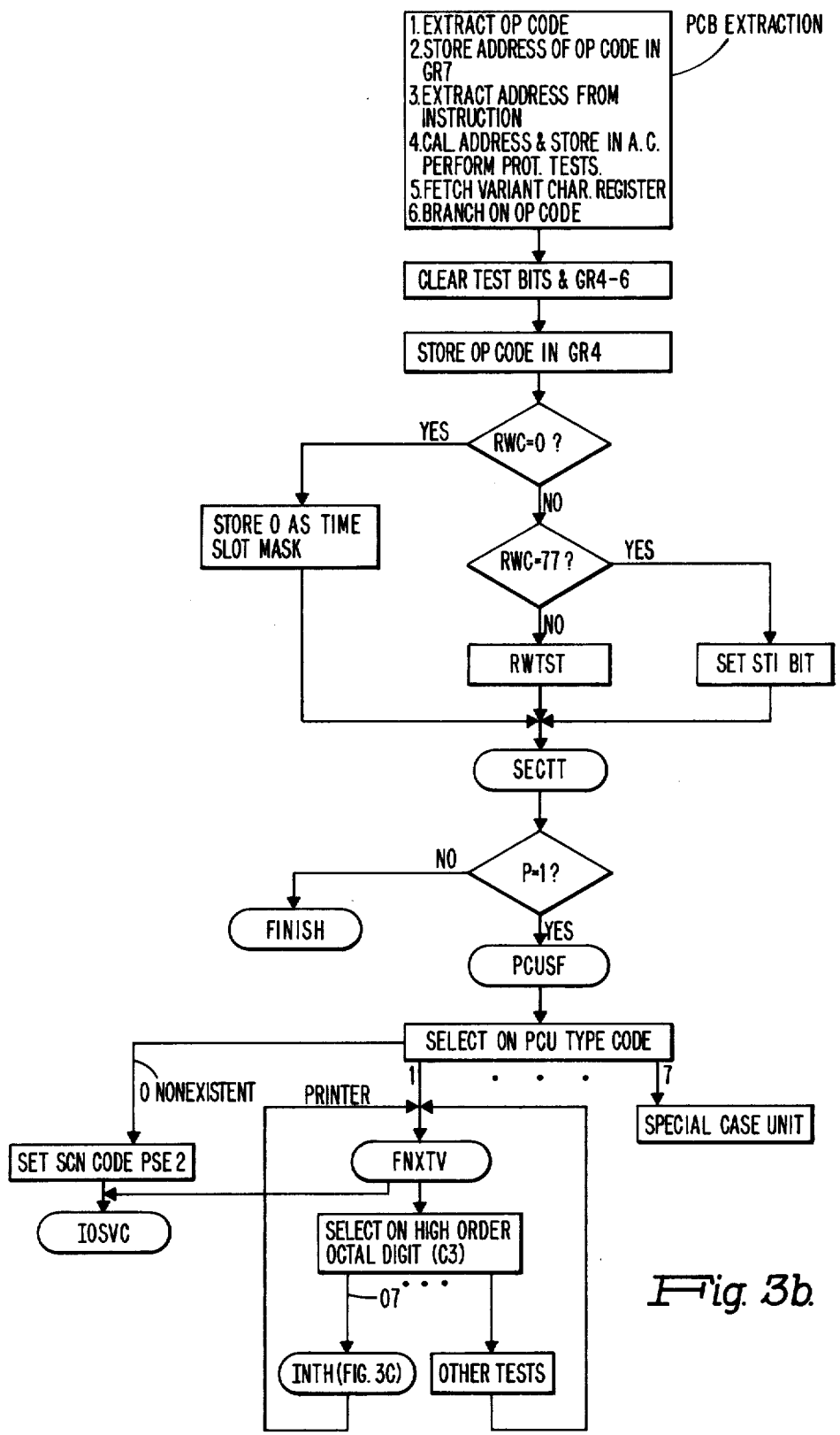
FIG. 3b is a flow chart which illustrates the processing of a control I/O instruction.

FIG. 3b is a flow diagram illustrating the operations performed during the processing of the PCB instruction. It is assumed that the PCB instruction has the following format: op code/C1/C2/C3 (see FIG. 6). The C1 control character normally designates a read/write channel and when a test and branch operation is not required, as in this instance, the C1 character contains ZEROS. The C2 character is coded to designate the address of the PCU whose interrupt status is to be altered. The C3 character is coded to have its high order digit contain a code of $7_8$ indicating the alteration of the interrupt status of the PCU. The next digit is coded to indicate how the PCU's interrupt status is to be altered. For example, the following codes in OCTAL are used to designate the following types of operations for storage devices:

1. $0_8$ = turn control allow function off;
2. $1_8$ = turn control allow function on;
3. $2_8$ = turn device allow function off;
4. $3_8$ = turn device allow function on;
5. $4_8$ = turn the control interrupt function off;
6. $5_8$ = branch to A address if control interrupt function on;
7. $6_8$ = turn device interrupt function off;
8. $7_8$ = branch to A address if device interrupt function is on.

Referring to FIG. 3b, the compatibility feature circuits extract the PCB instruction and store various portions of the instruction as indicated. Since it is assumed that the instruction does not specify a test operation, the RWC code will be an all ZERO code and the compatibility feature circuits are operative to perform a sector test operation. For other than RWC codes of ZERO and 77, the circuits perform a RWC test operation which includes the operations illustrated in FIG. 4a.

Figure 4A:
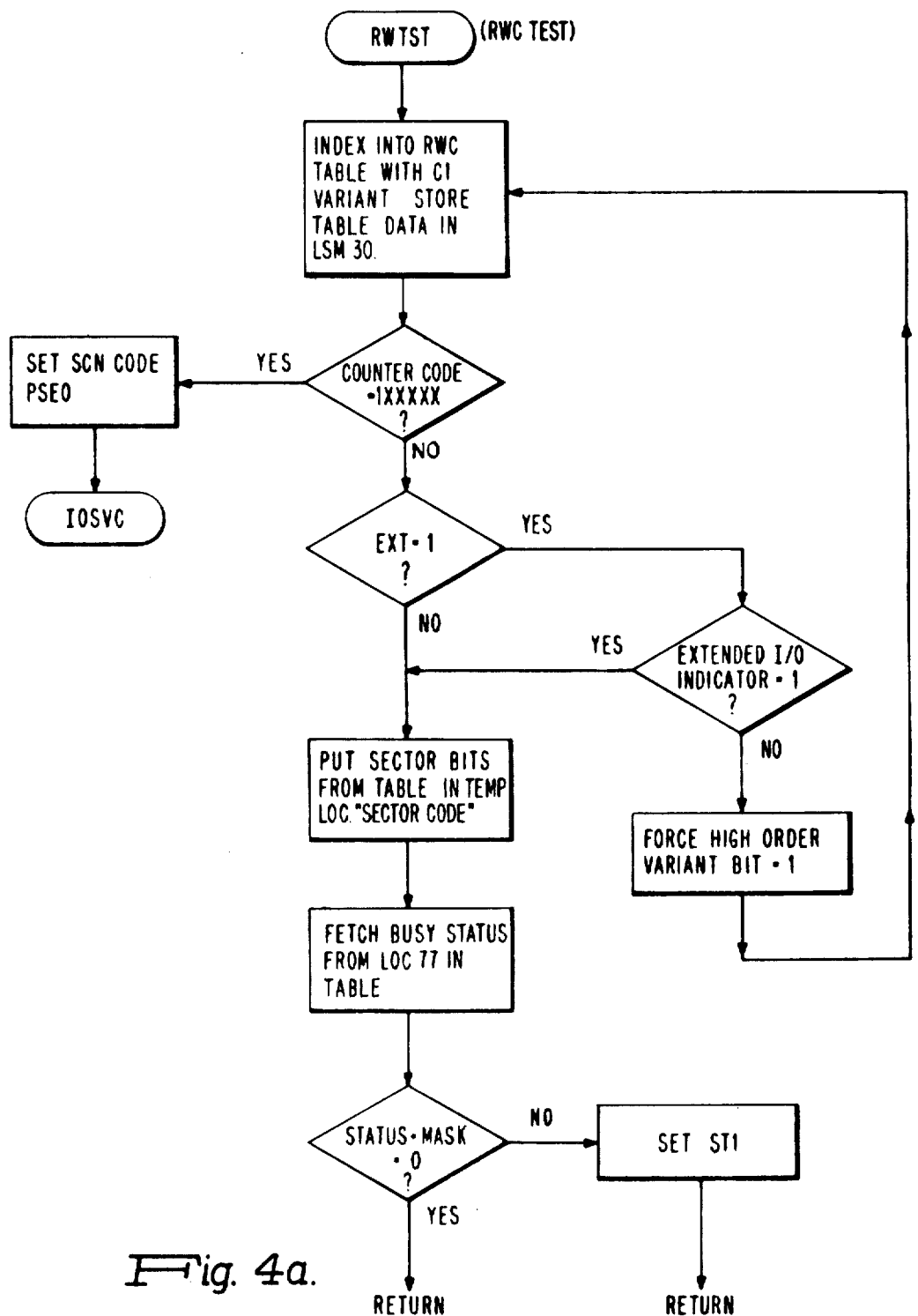
FIG. 4a is a flow chart of the read/write channel test routine of FIG. 3b.
Figure 4B:
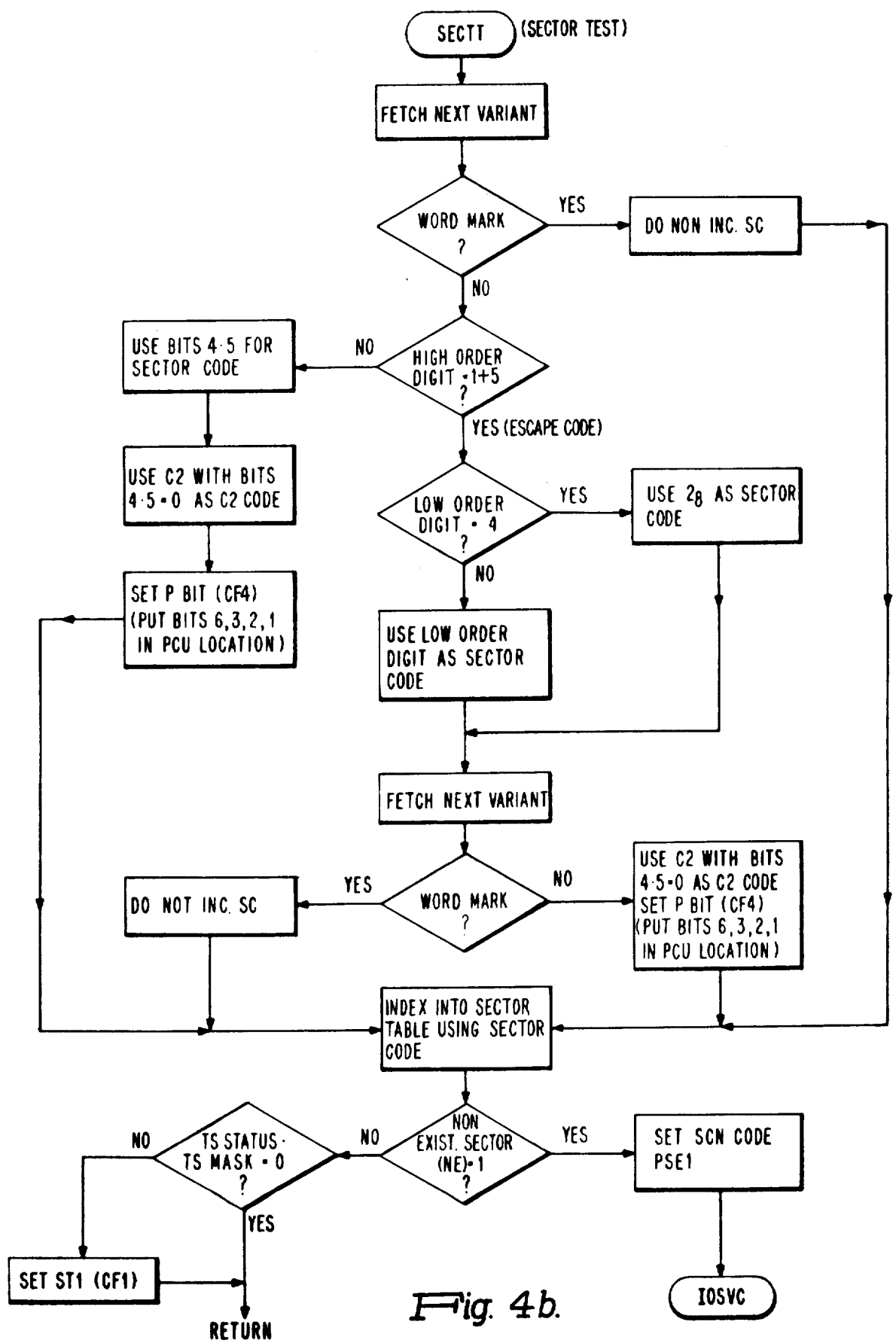
FIG. 4b is a flow chart of the sector test routine of FIG. 3b.

FIG. 4b illustrates the sector test routine in which a next control variant character (i.e. C2 character) is fetched for determining the particular instruction format. Since this is not the last character, the "word mark" test is negative causing the compatibility feature circuits to test whether the high digit has a value of 1 or 5. Since it does not, the test is negative and the low order bits or digits specify the sector bus in the target system (i.e. bits 3 and 4 of the C2 character of FIG. 6). As seen from the flow chart, this value is stored (i.e. sector code address is written into location UW2 of the URF). Also, the PCU code (i.e. C2 bits 6, 3, 2, 1 in FIG. 6) is stored. Next, the sector code is used to index into the sector table for fetching the sector table entry for testing the status of the sector bus. Because a sector mask of all ZEROS is used (see FIG. 3b), the result of the test in this example is ZERO. Upon the completion of the test, the routine returns to the main routine upon which it begins execution of the peripheral control status fetch routine which fetches the appropriate PCU entry. The routine indexes into the PCU table using the PCU code obtained from the C2 character and fetches the entry. The PCU ID code is stored and then used to perform a N way branch based upon the hexidecimal value of the PCU code to select the appropriate device routine.

Figure 3C:
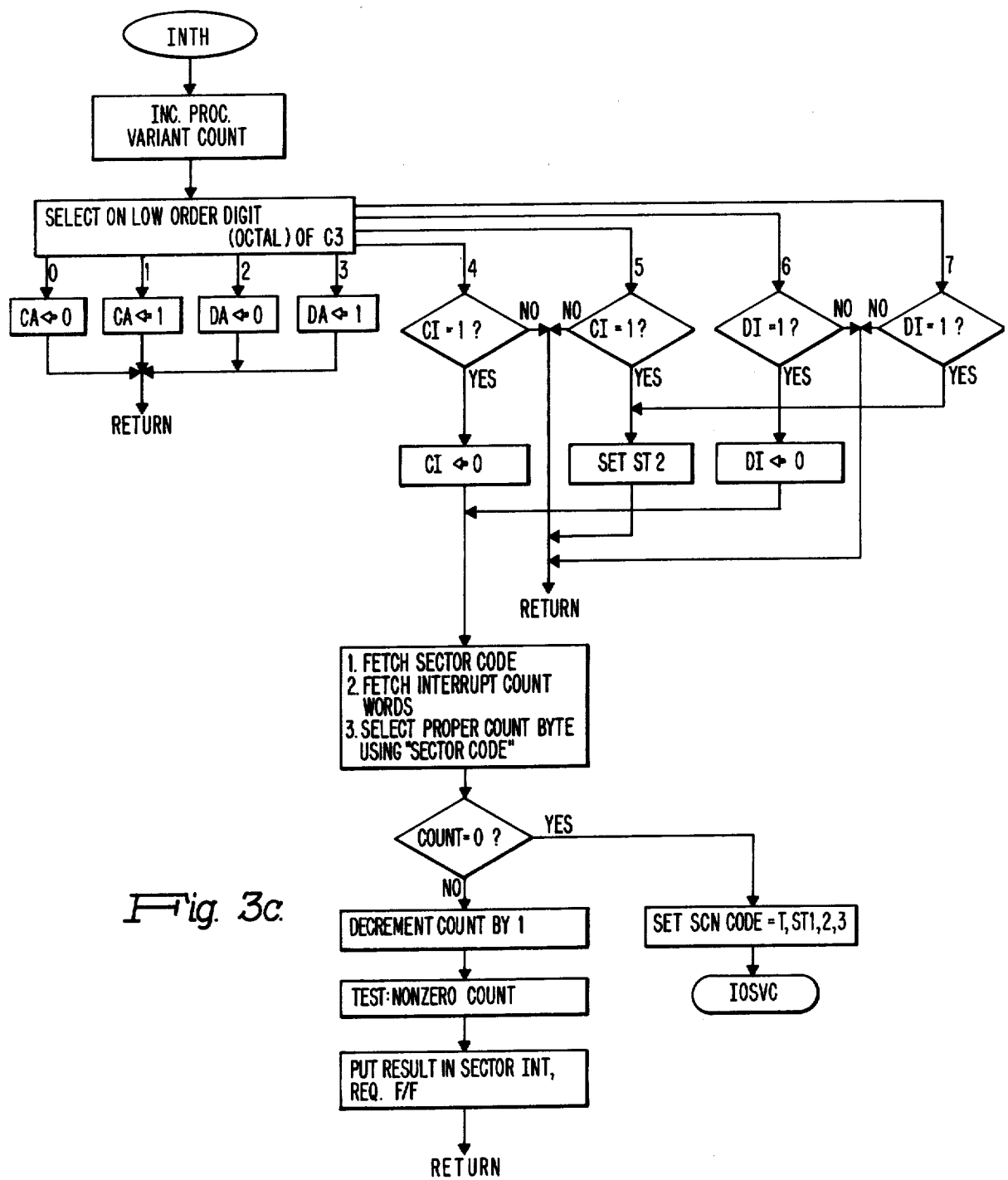
FIG. 3c is a flow chart of the interrupt handler routine of FIG. 3b.

The device routine performs operations such as those indicated which involve first the fetching of the next variant control character (i.e. C3 character). As seen from FIG. 3b, the compatibility feature circuits test the value of the high order digit and based on that value select the appropriate routine. Since the high order digit has an OCTAL value of 7, the interrupt handler routine of FIG. 3c is executed. This routine is shown in greater detail in FIG. 3d.

Referring to FIG. 3c, it is seen that the routine is operative to branch to one of eight sequences (i.e. microinstruction 101 of FIG. 3d) for performing the indicated status change which involves altering predetermined bits contained within the PCU entry. When the low order digit has a value of 0 through 3, the compatibility feature circuits are operative to switch the control allow (CA) and device allow (DA) bits off and on as indicated (i.e. microinstructions 200 through 302). Low order digit values of 5 an 7 are involved in branch operations which test the state of the control interrupt and device interrupt bits.

When the low order digit has a value of $4_8$ or $6_8$ this indicates that the status of the interrupt function of the PCU or device is to be turned off. As seen from FIG. 3c, this causes the CI and DI bits of the PCU entry to be tested and when they are binary ONES, they are switched to binary ZEROS (microinstructions 204 through 600, 206 through 532 of FIG. 3d). Following that, microinstructions are executed which fetch the "sector code" and the interrupt count words. The appropriate count word for the sector bus is selected for modification using the sector code value (microinstruction 609 of FIG. 3d). First, the selected interrupt count is tested to determine whether it is ZERO. When the test is positive, the compatibility feature circuits generate a predetermined SCN code (i.e. microinstructions 816 and 916) signaling condition which causes a trap to the I/O service call routine for completing the processing of the PCB instruction. That is, the routine fetches the remaining variant characters, here none required, load the pertinent portions of the PCB instruction into the LSM and signals the ESP.

Assuming the interrupt count is not ZERO, the compatibility feature circuits are operative to decrement the interrupt count by one and generate the signal EISEFO (i.e. microinstructions 618 and 717 of FIG. 3d) which sets the interrupt request flip-flop for the sector bus in accordance with the result. Next, the compatibility feature circuits return to the main routine which executes the fetch next variant character. Since the C3 character is the last character, an exit is made to the I/O service call routine.

From the above, it is seen that the compatibility feature circuits are operative upon encountering a PCB instruction specifying the turn-off of an interrupt function which had been turned on, decrements the interrupt count for the sector bus specified by the instruction.

The ESP performs a similar operation in case of a PDT instruction after the instruction had been processed by the compatibility feature circuits when they have signaled the ESP that such instruction can be issued in that all the resources specified by the instruction are available for assignment. FIG. 3e illustrates the operations performed by the compatibility feature circuits for determining the availability of resources. For the purpose of the present invention, it can be assumed that all resources are present in which case the compatibility feature circuits deliver a SCN code indicating the type of PDT instruction (i.e. device type) and that all resources are available.

By means of conventional instructions fetched using the instruction counter contents of the PCB, the ESP when ready to issue the PDT instruction is operative to execute an instruction sequence which accesses the I/O tables for setting up the correct status simulating the operation of the target system. For example, the ESP is operative to swtich on the busy bit (CB) in the PCU table entry, as well as set the assigned time slots to a busy state. Also, during these operations, the ESP is operative to set interrupt bits (CI/DI) of the PCU entry to an off state. Similar to the operations just described in connection with the PCB instruction, the ESP at the same time decrements the sector count by one when it finds the interrupt bit on.

Following either a PCB or PDT instruction, the compatibility feature circuits execute a RVI instruction for restoring the status followed by a RNM instruction for returning the target system program to the interrupted program. As part of the processing of the RNM instruction, the compatibility feature circuits examine the contents of the interrupt count words to determine whether interrupt processing should continue (i.e. there is still an outstanding interrupt). If there are no outstanding interrupts, the contents of the sequence counter and interrupt registers are interchanged and the EI flip-flop is reset to a binary ZERO causing the compatibility feature circuits to return to normal processing. When there are outstanding interrupts, the above operations are repeated.

It will be appreciated that whenever an input/output operation is completed, the ESP interrupt handler software which can be considered conventional for the purposes of this explanation is invoked. This causes the ESP to execute a series of instructions for accessing the I/O tables and making the appropriate status changes. For example, it will free up the assigned time slots in addition to turning off the busy bit (CB) contained in the PCU entry for the particular PCU. More importantly, the ESP will turn on the PCU interrupt bit (CI or DI). At the same time, the ESP will fetch the count word for the sector bus and increment the count by one. This operation simulates the target system operation in which the PCU or device upon completing an I/O operation switches on its Interrupt Store function which applies an interrupt signal to the common interrupt line of the bus to which it connects.

From the foregoing, it is seen that the arrangement of the present invention is able to provide expeditious interrupt processing of target system programs where it is required that groups of target system PCU's/devices connect in common and connected to share a common interrupt facility. Also, the emulator apparatus of the present invention by using information contained in a number of tables is able to perform all required interrupt operations through the introduction of a minimal amount of additional information and through a minimum loss in system processing time. This in turn results in improving the overall performance of the host system.

To prevent undue burdening the description with matter within the ken of those skilled in the art, a block diagram approach has been followed with a detailed functional description of each block and specific identification of the circuits it represents. The individual engineer is free to select elements and components such as flip-flop circuits, shift registers, etc. from the individual's own background or from available standard references such as those referenced herein.

Also, the exact coding patterns for the individual microinstructions were not disclosed since the engineer is free to select alternate forms of coding. For further details and insight into techniques for deriving such coding, see the text titled "Microprogramming Principles and Practices" by S. S. Husson published by Prentice-Hall, Inc., Copyright 1970.

It will be appreciated by those skilled in the art that many changes may be made to the preferred embodiment of the present invention. For example, in the case where certain types of resources need not be specified by input/output instructions, certain tables and tests performed by microinstruction routines can be either simplified or omitted. Also, alternate arrangements of mode switching and microprogram control elements can be used. For example, it may be desirable to use a separate microprogram control element rather than a common control element for storing emulation microinstruction routines. Other arrangements will be readily apparent to those skilled in the art.

While in accordance with the provisions and statutes there has been illustrated and described the best form of the invention known, certain changes may be made to the system described without departing from the spirit and scope of the invention as set forth in the appended claims and that in some cases, certain features of the invention may be used to advantage without a corresponding use of other features.

What is claimed is:

1. A data processing system for handling interrupts received from a peripheral subsystem coupled to said data processing system during the execution of a target system program from a plurality of target system peripheral control means which in the target system being emulated couple to a plurality of peripheral devices, and connect in common to share the common interrupt hardware facilities of said target system said data processing system including:

a main store having a plurality of storage locations;

a first group of said storage locations coded to store instructions of said target system program, said instructions including at least one input/output instruction involving the processing of interrupts generated during execution of said target system program by any one of said peripheral control means connected in common to share the common interruption facilities of said target system;

a second group of said storage locations, each location coded to store signals representative of said interrupts received from said peripheral subsystem and corresponding to the interrupt status indications for a different one of said plurality of peripheral control means of said target system being emulated;

a third group of said storage locations coded for indicating the interrupt status of said emulated target system, at least one of said locations storing an interrupt count representing the number of said peripheral control means of said emulated target system having interrupt conditions; and, microprogram control means for storing sequences of microinstructions for conditioning said system for processing instructions in at least first and second modes, said control means including branch means, said branch means when said control means is operated in a first mode during the execution of a target system input/output instruction coded to specify the altering of the interrupt status signals of a specified one of said plurality of target systems peripheral control means is caused by said instructions to reference a predetermined one of said sequences, said microprogram control means further including decode means, said decode means being conditioned by microinstructions of said one sequence to generate signals for conditioning said data processing system to switch one of said second group of said locations storing signals corresponding to interrupt status indicators of said specified peripheral control means to a predetermined state and generate signals for modifying the interrupt count contents of said one location of said third group for indicating said interrupt status of all of said plurality of peripheral control means.

2. The system of claim 1 wherein said branch means of said microprogram control means in response to one type of input/output instruction coded to specify a data transfer operation requiring the availability of a plurality of different classes of resources including one of said peripheral control means when conditioned by signals indicating that all of said resources specified by said one type of input/output instruction are available for executing said transfer operation to reference another sequence of microinstructions, said decode means being responsive to said another sequence to generate signals for conditioning said system to switch the signals corresponding to said interrupt status indicator of said one peripheral control means and to decrement said interrupt count contents of said one location by one.

3. The system of claim 2 wherein said sequence of microinstructions is executed when said system is conditioned by said microprogram control means to process instructions in said second mode.

4. The system of claim 3 wherein said branch means when said system is operated in said second mode is responsive upon receiving an interrupt signal indicating the completion of said data transfer operation by said host system to condition said control means to reference a sequence of microinstructions, said decode means being responsive to said sequence to generate signals for accessing said interrupt count contents and for incrementing said contents by one.

5. The system of claim 1 wherein said each location storing said interrupt status indicators for each of said peripheral control means include:

a first bit location coded to indicate when a peripheral control means has an interrupt stored;

a second bit location coded to indicated when said peripheral control means has an interrupt allowed;

a third bit location coded to indicated when a device connected to said peripheral control means has an interrupt stored and a fourth means bit location coded to indicate when said device has an interrupt allowed, and said microprogram control means including a sequence of microinstructions referenced when said input/output instruction is coded to specify resetting of said peripheral control means or said peripheral device, said decode means being response to said sequence to generate signal to switch said first and third bit locations respectively from a binary ONE ot a binary ZERO and to decrement said interrupt count contents by one.

6. The system of claim 1 wherein said branch means includes means responsive to a non-zero interrupt count representative of a binary ONE result of performing a logical OR of all of the interrupt indicators of said plurality of peripheral control means to condition said microprogram control means for processing target system program interrupts and said means being responsive to a zero interrupt count representative of a binary ZERO result of performing said logical OR of all of said interrupt indications to condition said microprogram control means to enable said system for continuing execution of said target system program.

7. A host system including a peripheral subsystem, said host system for processing instructions of a target system program normally executed in a target system having a first number of peripheral elements connected to share a common interrupt facility, said program including a plurality of instructions coded in any one of a plurality of formats, said host system further comprising:

first storage means including a plurality of segments, each having a plurality of addressable storage locations, a first one of said segments being arranged to store said target system program, said plurality of instructions including at least one input/output instruction having an op code character and a plurality of control characters, a second one of said segments for storing as a consequence of signals received from said peripheral subsystem, indications of the interrupt status of said first number of target system peripheral elements not physically present in said host system connected to share said common interrupt facility and which can be specified for executing said input/output instruction and a third segment for storing a count indicating the interrupt status of said first number of target system peripheral elements; and control store means including a plurality of microprogram sequences, each including a plurality of microinstructions and decode means responsive to said microinstructions to generate control signals for conditioning said system to execute operations specified by said target system program, said control store means further including means operative in response to each input/output instruction having an op code and a predetermined one of said control characters coded to specify altering of an interrupt status indicator to condition said control store means to reference a predetermined one of said sequences, said decode means responsive to said predetermined one of said sequences to generate signals conditioning said system to switch to a predetermined state the interrupt status indicator of a peripheral element specified by said input/output instruction and to modify said count for indicating the number of interrupts outstanding for said first number of target system peripheral elements.

8. The system of claim 7 wherein said second segment includes a peripheral control resource table for storing a plurality of entries for each different number of said peripheral elements in said target system, one entry for each possible peripheral element which can be specified by said target system program, each said one entry coded to include said interrupt indicator status signals for said peripheral element and wherein said third segment includes a plurality of storage locations for storing counts for indicating the interrupt status of each of said different number of said peripheral elements; and said predetermined sequence including a first set of microinstructions conditioning said deconde means to generate signals to access one of said entries within a plurality of entries specified by said input/output instruction for switching said interrupt indicator status to a predetermined state and a second set of microinstructions conditioning said decode means to generate signals to access one of said storage locations storing a count specified by said instruction for decrementing said count by one so as to indicate the number of interrupts which are outstanding for said first number of peripheral elements after the processing of said instruction.

9. The system of claim 8 wherein said each one entry storing said interrupt indicator status signals for each of said peripheral control means includes a first bit location coded to store signals to indicate when a peripheral control element has an interrupt stored; and wherein said first set of microinstructions includes microinstructions coded for conditioning said decode means to generate signals for switching said first bit location to said predetermined state.

10. The system of claim 7 wherein one of said plurality of microprogram sequences includes one group of microinstructions, read out from said control store means in response to a non-zero interrupt count representative of a binary ONE result of performing a logical OR of all of said interrupt status indicators of said plurality of peripheral control elements, said decode means in response to said one group of microinstructions generating signals to condition said host system for processing target system program interrupts and another group of microinstructions read out from said control store in response to a zero interrupt count representative of a binary ZERO result of performing said logical OR of all of said interrupt indications, said decode means in response to said another group of microinstructionsgenerating signals to condition said system for continuing execution of said target system program.

11. The system of claim 7 wherein said control store means including means in response to said one input/output instruction having an op code character specifying a data transfer operation involving an assignment of a plurality of resources including one of said peripheral elements being operative upon such system verifying that all of said resources are available for executing said transfer operation to cause said control store to reference one of said microprogram program sequences, said decode means responsive to said one of said microprogram sequences to generate signals to switch said interrupt status indicator of said one of said peripheral elements and to decrement by one said interrupt count.

12. The system of claim 11 wherein said control store means includes first and second sequences of microinstructions for controlling the operations of said host system in first and second modes corresponding to a native and emulated modes respectively, and said second sequence of microinstructions being executed when said host system is conditioned to process instructions in said second mode.

13. The system of claim 12 wherein said host system when operated in said second mode is operative upon receiving an interrupt signal indicating the completion of said data transfer operation by said host system to reference microinstructions of said first sequence of microinstructions for accessing said interrupt count for microinstructions for accessing said interrupt count for incrementing said count by one.

14. A method for facilitating the processing of interrupts from a plurality of peripheral control elements in connection with the emulation of different types of input/output instructions during the execution of a target system program by a data processing system including a peripheral subsystem, a main store having a plurality of sections, one section for storing a plurality of tables, each of the tables including signals corresponding to a plurality of entries coded to define the status of each resource of one of a plurality of different classes including said plurality of peripheral control elements not physically present in said system which can be specified for executing said target system input/output instructions, arithmetic and logic means coupled to receive data signals from said main store and microprogram control means for controlling the transfer of data signals between said store and said arithmetic and logic means in a native and in an emulation mode of operation by decoding microinstructions contained in a control store included therein, said method comprising the steps of:

storing in a predetermined one of said tables the interrupt status signals resulting from signals received from said peripheral subsystem for each different group of those resources corresponding to different ones of said plurality of peripheral control elements connected to a common sector bus to share a common interrupt facility within said target system in response to the execution of such input/output instructions when said system is in an emulation mode of operation;

storing in a further section signals indicative of a count representing the number of interrupts which are outstanding on each said sector bus;

storing a plurality of microinstruction sequences in said control store for accessing different ones of said plurality of entries of one of said plurality of tables, one of said sequences for processing input/output instructions specifying alteration of the interrupt status of said resources; and, execution said one of said sequences in response to an input/output instruction coded in specifying said alteration of the interrupt status of one of said resources connected to said sector bus specified to fetch signals representative of said interrupt status and said count for modifying same in accordance with said input/output instruction.

15. The method of claim 14 wherein said step of executing said one of said sequences for an input/output instruction coded to specify the resetting of the signals representative of said interrupt status of a resource stored in said predetermined one of said tables further includes the steps of:

resetting the signals defining the interrupt status of an entry corresponding to the resource specified by a predetermined portion of said input/output instruction being processed; and decrementing by one said signals corresponding to said count to indicate the number of interrupts which are outstanding on said specified sector bus following the processing of said input/output instruction.

16. The method of claim 14 wherein said step of executing for processing an input/output instruction specifying a data transfer operation requiring the availability of certain ones of said resources further includes the steps of:

first executing certain ones of said microinstruction sequences for determining when all of said resources specified are available for executing said transfer operation; and executing another sequence of microinstructions similar to said one of said sequences upon verifying that said all of said resources specified are available to fetch signals representative of said interrupt status and said count for modifying same in accordance with said input/output instruction.

17. The method of claim 16 wherein the step of executing another sequence of microinstructions for an input/output data transfer instruction coded to specify the resetting of the interrupt status of one of said resources stored in said predetermined one of said tables further includes the steps of:

resetting the signals defining the interrupt status of an entry corresponding to said one of said resources; and decrementing by one count to indicate the number of interrupts which are outstanding on said sector bus following the processing of said input/output instruction.

18. The method of claim 16 wherein said step of executing said another sequence is performed when said data processing system is conditioned to operate in said native mode by said control store.

19. The method of claim 18 wherein said method further includes the step of:

executing a predetermined sequence of microinstructions when in said data processing system is in said native mode upon receiving an interrupt signal indicating the completion of said data transfer operation by said system for incrementing said count by one for indicating the number of interrupts outstanding on said sector bus subsequent to the completion of said data transfer operation.

20. The method of claim 14 wherein said method further includes the steps of:

generating in response to a non-zero interrupt count a signal representative of a binary ONE result of performing a logical OR of all of the signals defining the interrupt status of all of of said resources connected to each said common sector bus for conditioning said system for processing target system program interrupts; and generating in response to a zero interrupt count a signal representative of a binary ZERO result of performing a logical OR of all the signals defining the interrupt status of all of said resources for conditioning said system to continue execution of said target system program.

21. A host data processing system for processing instructions of a target system program including data transfer and control types of input/output instructions coded in different formats normally executed by a target system having a plurality of peripheral elements which connect in common to share the common interrupt facilities of said target system, said host system comprising:

first storage means including a plurality of segments, each having a plurality of addressable storage locations, first one of said segments for storing said target system program, said program including at least one input/output instruction having an op code character and a plurality of control characters, a second one of said segments for storing signal indications resulting from signals received from said peripheral subsystem of the interrupt-status of at least a first number of said target system peripheral elements not physically present is said host system connected in common which can be specified by said input/output instructions for the execution thereof and a third segment for storing signals representative of a count indicating the interrupt status of said first number of target system peripheral elements;

a plurality of registers coupled to said first storage means for storing different ones of said control characters of said one input/output instruction during the execution thereof;

arithmetic and logic means coupled to said plurality of registers; and, a control store means coded to include a plurality of microprogram sequences, each including a plurality of microinstructions and decode means responsive to said microinstructions to generate control signals for controlling the transfer of information bytes between said first storage means, said plurality of registers and said arithmetic and logic means when said system is conditioned by said control store means for operating in a native and emulation mode and branch and testing means coupled to said arithmetic and logic means and to said plurality of registers, and said control store means being conditioned by said branch and testing means in response to each input/output instruction having an op code and a predetermined one of said control characters coded to specify altering of an interrupt status indicator to reference a predetermined one of said sequences, said decode means being responsive to said sequence for generating signals conditioning said arithmetic and logic means to switch the interrupt status indicator siganls of a target system peripheral element specified by said input/output instruction to a predetermined state and to decrement said signals corresponding to said count for indicating the number of interrupts outstanding for said first number of target system peripheral elements.

22. The system of claim 21 wherein
said second segment includes a peripheral control resource table for storing signals corresponding to a plurality of entries for each different number of said peripheral elements in said target system, one entry for each possible peripheral element which can be specified by said target system program, each said one entry coded to include signals corresponding to said interrupt indicator status of said peripheral element and wherein
said third segment includes a plurality of storage locations for storing signals representative of counts for indicating the interrupt status of each of said different number of said peripheral elements;
said control store means when conditioned by said branch and testing means to reference said predetermind sequence, said sequence including first and second sets of microinstructions, said decode means in response to said first set of microinstructions generating signals for conditioning said system to access one of said entries within a plurality of entries specified by said input/output instruction for switching said signals of said interrupt indicator status to a predetermined state and said decode means in response to said second set of microinstructions generating signals for conditioning said system to access one of said storage locations storing signals representative of a count specified by said instruction and decrementing said count by one so as to indicate the number of interrupts which are outstanding for said one numer of peripheral elements after th execution of said instruction.

23. The system of claim 21 wherein said system further includes means coupled to said branch and testing means, said means being responsive to signals representative of a non-zero interrupt count corresponding to a binary ONE result of performing a logical OR of all of the interrupt indicators of said plurality of peripheral control means to generate signals to condition said control store means for enabling said system to process target system program interrupts associated with said peripheral elements and said means being responsive to signals representative of a zero interrupt count corresponding to a binary ZERO result of performing said logical OR of all of said interrupt indications to condition said control store means to read out microinstructions for generating signals causing said system to continue execution of said target system program.

24. The system of claim 23 wherein said branch and testing means in response to one type of input/output instruction coded to specify a data transfer operation requiring the availability of a plurality of different classes of resources including one of said peripheral elements upon verifying that all of said resources are available for executing said transfer operation being operative to condition said control store means to reference a sequence of microinstructions, said decode means in response to said, sequence generating signals for conditioning said arithmetic and logic means to switch said interrupt status indicator of said one peripheral element and to decrement said count by one.

25. The system of claim 24 wherein said sequence of microinstructions is executed when said system is conditioned by said control store means to process instructions in said native mode.

26. The system of claim 25 wherein said branch and testing means of said sytem when operated in said second mode is operative upon receiving an interrupt signal indicating the completion of said data transfer operation by said host system to condition said control store to reference a further sequence of microinstructions, said decode means in response to said further sequence being operative to generate signals for conditioning said arithmetic and logic means to increment said count by one.

* * * * *

UNITED STATES PATENT OFFICE
CERTIFICATE OF CORRECTION

Patent No. 4,031,517            Dated June 21, 1977

Inventor(s) Allen C. Hirtle

It is certified that error appears in the above-identified patent and that said Letters Patent are hereby corrected as shown below:

In the Abstract, line 3, after "system" insert --being emulated--.

In the Abstract, line 5, delete "being emulated".

Column 23, line 25, delete "systems" and insert --system--.

Column 23, line 27, delete "tions" and insert --tion--.

Column 24, line 20, delete "ot" and insert --to--.

Column 25, line 25, delete "deconde" and insert --decode--.

Column 25, line 62, delete "croinstructionsgenerating" and insert --croinstructions generating--.

Column 26, line 5, delete "program".

Column 26, line 24, delete "microinstructions for accessing said interrupt count for".

Column 26, line 33, after "storing" insert --said target system program, another section for storing--.

Column 26, line 67, delete "execution" and insert --executing--.

Column 26, line 68, delete "in" and insert --for--.

Column 27, line 45, after "one" insert --said--.

Column 28, line 10, after "system" insert --including a peripheral subsystem, said host system--.

UNITED STATES PATENT OFFICE
CERTIFICATE OF CORRECTION

Patent No. 4,031,517          Dated June 21, 1977

Inventor(s) Allen C. Hirtle

It is certified that error appears in the above-identified patent and that said Letters Patent are hereby corrected as shown below:

Column 28, line 62, delete "siganls" and insert --signals--.

Column 29, line 17, delete "termind" and insert --termined--.

Column 29, line 31, delete "numer" and insert --number--.

Column 29, line 32, delete "th" and insert --the--.

Column 30, line 30, delete "sytem" and insert --system--.

Signed and Sealed this

Seventeenth Day of October 1978

[SEAL]

Attest:

RUTH C. MASON  
Attesting Officer

DONALD W. BANNER  
Commissioner of Patents and Trademarks